US009991697B1

(12) United States Patent
Howard et al.

(10) Patent No.: US 9,991,697 B1
(45) Date of Patent: Jun. 5, 2018

(54) FAIL OPEN OR FAIL SHORT SURGE PROTECTOR

(71) Applicant: Transtector Systems, Inc., Hayden, ID (US)

(72) Inventors: Mathew Howard, Coeur d'Alene, ID (US); Michael Dole, Rathdrum, ID (US); Randall Palmer, Greenacres, WA (US)

(73) Assignee: TRANSTECTOR SYSTEMS, INC., Hayden, ID (US)

( * ) Notice: Subject to any disclaimer, the term of this patent is extended or adjusted under 35 U.S.C. 154(b) by 0 days. days.

(21) Appl. No.: 15/371,011

(22) Filed: Dec. 6, 2016

(51) Int. Cl.
*H01H 85/04* (2006.01)
*H02H 9/04* (2006.01)
*H01H 85/00* (2006.01)
*H01C 7/12* (2006.01)

(52) U.S. Cl.
CPC ............. *H02H 9/042* (2013.01); *H01C 7/12* (2013.01); *H01H 85/0013* (2013.01); *H01H 85/04* (2013.01)

(58) Field of Classification Search
CPC ........ H02H 9/42; H01C 7/12; H01H 85/0013; H01H 85/04
USPC .......................................................... 337/15
See application file for complete search history.

(56) References Cited

U.S. PATENT DOCUMENTS

| 2,030,179 | A | 2/1936 | Potter |
| 3,167,729 | A | 1/1965 | Hall |
| 3,323,083 | A | 5/1967 | Ziegler |
| 3,596,165 | A | 7/1971 | Andrews |
| 3,619,721 | A | 11/1971 | Westendorp |
| 3,663,901 | A | 5/1972 | Forney, Jr. |
| 3,731,234 | A | 5/1973 | Collins |
| 3,750,053 | A | 7/1973 | LeDonne |
| 3,783,178 | A | 1/1974 | Philibert |
| 3,831,110 | A | 8/1974 | Eastman |
| 3,832,627 | A | 8/1974 | Ohsawa |
| 3,845,358 | A | 10/1974 | Anderson et al. |
| 3,921,015 | A | 11/1975 | Obeda et al. |
| 3,944,937 | A | 3/1976 | Fujisawa et al. |

(Continued)

FOREIGN PATENT DOCUMENTS

| CH | 675933 | 11/1990 | |
| DE | 19545505 C1 * | 5/1997 | ............... H01C 7/12 |

(Continued)

*Primary Examiner* — Anatoly Vortman
(74) *Attorney, Agent, or Firm* — Snell & Wilmer

(57) ABSTRACT

A surge protector includes a first and second contact connected via an energy absorbing element, such that electrical current travels from the first contact to the second contact via the energy absorbing element. The surge protector further includes a thermal spacing unit contacting the energy absorbing element and configured to be in a first physical state or a second physical state based on a temperature of the energy absorbing element. The surge protector further includes a connection unit connected to the second contact, the connection unit configured to be in a first position when the thermal spacing unit is in a first physical state and a second position when the thermal spacing unit is in a second physical state, such that the electrical current from the first contact to the second contact via the energy absorbing element is interrupted when the connection unit is in the second position.

19 Claims, 23 Drawing Sheets

(56) References Cited

U.S. PATENT DOCUMENTS

| | | | |
|---|---|---|---|
| 3,956,717 A | 5/1976 | Fisher et al. | |
| 3,980,976 A | 9/1976 | Tadama et al. | |
| 4,021,759 A | 5/1977 | Camp | |
| 4,046,451 A | 9/1977 | Juds et al. | |
| 4,047,120 A | 9/1977 | Lord et al. | |
| 4,112,395 A | 9/1978 | Seward | |
| 4,262,317 A | 4/1981 | Baumbach | |
| 4,356,360 A | 10/1982 | Volz | |
| 4,359,764 A | 11/1982 | Block | |
| 4,384,331 A | 5/1983 | Fukuhara et al. | |
| 4,409,637 A | 10/1983 | Block | |
| 4,481,641 A | 11/1984 | Gable et al. | |
| 4,554,608 A | 11/1985 | Block | |
| 4,563,720 A | 1/1986 | Clark | |
| 4,586,104 A | 4/1986 | Standler | |
| 4,689,713 A | 8/1987 | Hourtane et al. | |
| 4,698,721 A | 10/1987 | Warren | |
| 4,727,350 A | 2/1988 | Ohkubo | |
| 4,901,183 A | 2/1990 | Lee | |
| 4,952,173 A | 8/1990 | Peronnet et al. | |
| 4,984,146 A | 1/1991 | Black et al. | |
| 4,985,800 A | 1/1991 | Feldman et al. | |
| 5,053,910 A | 10/1991 | Goldstein | |
| 5,057,964 A | 10/1991 | Bender et al. | |
| 5,102,818 A | 4/1992 | Paschke et al. | |
| 5,122,921 A | 6/1992 | Koss | |
| 5,124,873 A | 6/1992 | Wheeler | |
| 5,142,429 A | 8/1992 | Jaki | |
| 5,166,855 A | 11/1992 | Turner | |
| 5,170,151 A | 12/1992 | Hochstein | |
| 5,278,720 A | 1/1994 | Bird | |
| 5,321,573 A | 6/1994 | Persona et al. | |
| 5,353,189 A | 10/1994 | Tomlinson | |
| 5,412,526 A | 5/1995 | Kapp et al. | |
| 5,442,330 A | 8/1995 | Fuller et al. | |
| 5,534,768 A | 7/1996 | Chavannes et al. | |
| 5,537,044 A | 7/1996 | Stahl | |
| 5,611,224 A | 3/1997 | Weinerman et al. | |
| 5,617,284 A | 4/1997 | Paradise | |
| 5,625,521 A | 4/1997 | Luu | |
| 5,667,298 A | 9/1997 | Musil et al. | |
| 5,721,662 A | 2/1998 | Glaser et al. | |
| 5,781,844 A | 7/1998 | Spriester et al. | |
| 5,790,361 A | 8/1998 | Minch | |
| 5,844,766 A | 12/1998 | Miglioli et al. | |
| 5,854,730 A | 12/1998 | Mitchell et al. | |
| 5,943,225 A | 8/1999 | Park | |
| 5,953,195 A | 9/1999 | Pagliuca | |
| 5,963,407 A | 10/1999 | Fragapane et al. | |
| 5,966,283 A | 10/1999 | Glaser et al. | |
| 5,982,602 A | 11/1999 | Tellas et al. | |
| 5,986,869 A | 11/1999 | Akdag | |
| 6,026,458 A | 2/2000 | Rasums | |
| 6,031,705 A | 2/2000 | Gscheidle | |
| 6,054,905 A | 4/2000 | Gresko | |
| 6,060,182 A | 5/2000 | Tanaka et al. | |
| 6,061,223 A | 5/2000 | Jones et al. | |
| 6,086,544 A | 7/2000 | Hibner et al. | |
| 6,115,227 A | 9/2000 | Jones et al. | |
| 6,137,352 A | 10/2000 | Germann | |
| 6,141,194 A | 10/2000 | Maier | |
| 6,177,849 B1 | 1/2001 | Barsellotti et al. | |
| 6,211,770 B1 * | 4/2001 | Coyle | H01C 7/126 338/101 |
| 6,226,166 B1 | 5/2001 | Gumley et al. | |
| 6,236,551 B1 | 5/2001 | Jones et al. | |
| 6,243,247 B1 | 6/2001 | Akdag et al. | |
| 6,252,755 B1 | 6/2001 | Willer | |
| 6,281,690 B1 | 8/2001 | Frey | |
| 6,292,344 B1 | 9/2001 | Glaser et al. | |
| 6,342,998 B1 | 1/2002 | Bencivenga et al. | |
| 6,381,283 B1 | 4/2002 | Bhardwaj et al. | |
| 6,385,030 B1 | 5/2002 | Beene | |
| 6,394,122 B1 | 5/2002 | Sibley et al. | |
| 6,421,220 B2 | 7/2002 | Kobsa | |
| 6,430,019 B1 * | 8/2002 | Martenson | H01C 7/126 361/103 |
| 6,502,599 B1 | 1/2003 | Sibley et al. | |
| 6,527,004 B1 | 3/2003 | Sibley et al. | |
| 6,535,369 B1 | 3/2003 | Redding et al. | |
| 6,721,155 B2 | 4/2004 | Ryman | |
| 6,754,060 B2 | 6/2004 | Kauffman | |
| 6,757,152 B2 | 6/2004 | Galvagni et al. | |
| 6,785,110 B2 | 8/2004 | Bartel et al. | |
| 6,789,560 B1 | 9/2004 | Sibley et al. | |
| 6,814,100 B1 | 11/2004 | Sibley et al. | |
| 6,816,348 B2 | 11/2004 | Chen et al. | |
| 6,876,533 B1 * | 4/2005 | Ryan | H01T 1/14 361/104 |
| 6,968,852 B1 | 11/2005 | Sibley | |
| 6,975,496 B2 | 12/2005 | Jones et al. | |
| 7,082,022 B2 | 7/2006 | Bishop | |
| 7,104,282 B2 | 9/2006 | Hooker et al. | |
| 7,106,572 B1 | 9/2006 | Girard | |
| 7,130,103 B2 | 10/2006 | Murata | |
| 7,159,236 B2 | 1/2007 | Abe et al. | |
| 7,221,550 B2 | 5/2007 | Chang et al. | |
| 7,250,829 B2 | 7/2007 | Namura | |
| 7,430,103 B2 | 9/2008 | Kato | |
| 7,453,268 B2 | 11/2008 | Lin | |
| 7,471,172 B2 | 12/2008 | Holst et al. | |
| 7,477,503 B2 * | 1/2009 | Aszmus | H01C 7/126 361/103 |
| 7,483,252 B2 * | 1/2009 | de Palma | H01C 7/112 361/127 |
| 7,507,105 B1 | 3/2009 | Peters et al. | |
| 7,623,332 B2 | 11/2009 | Frank et al. | |
| 7,675,726 B2 | 3/2010 | Bolz et al. | |
| 7,741,946 B2 * | 6/2010 | Ho | H01C 7/102 337/405 |
| 7,808,752 B2 | 10/2010 | Richiuso et al. | |
| 7,817,398 B1 | 10/2010 | Maples | |
| 7,839,257 B2 * | 11/2010 | Cernicka | H01C 7/126 337/142 |
| 8,031,456 B2 * | 10/2011 | Wang | H01T 1/14 361/117 |
| 8,378,778 B2 * | 2/2013 | Duval | H01C 7/126 338/13 |
| 8,502,637 B2 * | 8/2013 | Guarniere | H01C 7/10 338/21 |
| 8,836,464 B2 * | 9/2014 | Wang | H01C 7/126 337/401 |
| 9,165,702 B2 * | 10/2015 | Hagerty | H01C 7/126 |
| 9,570,260 B2 * | 2/2017 | Yang | H01H 37/761 |
| 2002/0167302 A1 | 11/2002 | Gallavan | |
| 2002/0191360 A1 | 12/2002 | Colombo et al. | |
| 2003/0072121 A1 | 4/2003 | Bartel et al. | |
| 2003/0151870 A1 | 8/2003 | Gronbach et al. | |
| 2003/0179533 A1 | 9/2003 | Jones et al. | |
| 2003/0211782 A1 | 11/2003 | Esparaz et al. | |
| 2004/0100751 A1 | 5/2004 | Ammann | |
| 2004/0121648 A1 | 6/2004 | Voros | |
| 2004/0145849 A1 | 7/2004 | Chang et al. | |
| 2004/0264087 A1 | 12/2004 | Bishop | |
| 2005/0036262 A1 | 2/2005 | Siebenthall et al. | |
| 2005/0044858 A1 | 3/2005 | Hooker et al. | |
| 2005/0176275 A1 | 8/2005 | Hoopes et al. | |
| 2005/0185354 A1 | 8/2005 | Hoopes | |
| 2005/0206482 A1 | 9/2005 | Du Toit et al. | |
| 2006/0044076 A1 | 3/2006 | Law | |
| 2006/0082946 A1 | 4/2006 | Duenez et al. | |
| 2006/0120005 A1 | 6/2006 | Van Sickle | |
| 2006/0139832 A1 | 6/2006 | Yates et al. | |
| 2006/0146458 A1 | 7/2006 | Mueller | |
| 2007/0053130 A1 | 3/2007 | Harwath | |
| 2007/0139850 A1 | 6/2007 | Kamel et al. | |
| 2008/0170346 A1 | 7/2008 | Van Swearingen | |
| 2009/0103226 A1 | 4/2009 | Penwell et al. | |
| 2009/0109584 A1 | 4/2009 | Jones et al. | |
| 2009/0284888 A1 | 11/2009 | Bartel et al. | |
| 2009/0296430 A1 | 12/2009 | Rieux-Lopez et al. | |
| 2011/0080683 A1 | 4/2011 | Jones et al. | |

(56) References Cited

U.S. PATENT DOCUMENTS

| | | |
|---|---|---|
| 2011/0141646 A1 | 6/2011 | Jones et al. |
| 2011/0159727 A1 | 6/2011 | Howard et al. |
| 2011/0279943 A1 | 11/2011 | Penwell et al. |

FOREIGN PATENT DOCUMENTS

| | | | |
|---|---|---|---|
| DE | 102010021246 | * 11/2011 | ............ H01C 7/12 |
| JP | 08-066037 | 3/1996 | |
| JP | 11-037400 | 2/1999 | |
| JP | 2003-070156 | 3/2003 | |
| JP | 2003-111270 | 4/2003 | |
| KR | 10-2003-0081041 | 10/2003 | |
| KR | 10-2009-0018497 | 2/2009 | |
| KR | 10-1189670 | 10/2012 | |
| WO | WO 95/10116 | 4/1995 | |
| WO | PCT/US03/17050 | 5/2003 | |
| WO | WO 2011-119723 | 12/2011 | |

\* cited by examiner

FAIL OPEN OR FAIL SHORT SURGE PROTECTOR

BACKGROUND

1. Field

The invention relates to surge protection. More particularly, the invention relates to triggering of an open circuit or a short circuit by a surge protection device.

2. Description of the Related Art

Surge protectors are used in various environments to protect sensitive electrical components from damage due to power surges (such as electricity associated with a lightning strike). Some surge protectors, for example, disconnect or create a short circuit during a power surge in order to limit the voltage supplied to the electric device to be protected. Surge protectors may be used in power distribution panels, process control systems, communications systems, or other industrial systems.

SUMMARY

Described herein is a surge protector providing protection during a surge event. The surge protector includes a first contact being electrically conductive and having a cavity defined by one or more walls and a bottom surface. The surge protector further includes a second contact being electrically conductive and having a contact surface. The surge protector further includes an energy absorbing element configured to absorb energy and release absorbed energy as heat, the energy absorbing element having a first contact surface and a second contact surface, the energy absorbing element located within the cavity, the first contact surface of the energy absorbing element contacting the bottom surface of the cavity and the second contact surface of the energy absorbing element contacting the contact surface of the second contact, such that electrical current travels from the first contact to the second contact via the energy absorbing element. The surge protector further includes a thermal spacing unit contacting the energy absorbing element, the thermal spacing unit configured to be in a first physical state or a second physical state based on a temperature of the energy absorbing element. The surge protector further includes a connection unit connected to the second contact, the connection unit configured to be in a first position when the thermal spacing unit is in a first physical state and a second position when the thermal spacing unit is in a second physical state, such that the electrical current travelling from the first contact to the second contact via the energy absorbing element is interrupted when the connection unit is in the second position.

Also described is a surge protector providing protection during a surge event. The surge protector includes a first contact being electrically conductive. The surge protector further includes a second contact being electrically conductive. The surge protector further includes an energy absorbing element configured to absorb energy and release absorbed energy as heat, the energy absorbing element having a first contact surface and a second contact surface, the first contact surface of the energy absorbing element contacting the first contact and the second contact surface of the energy absorbing element contacting the second contact, such that electrical current travels from the first contact to the second contact via the energy absorbing element. The surge protector further includes a thermal spacing unit contacting the energy absorbing element, the thermal spacing unit configured to be in a first physical state or a second physical state based on a temperature of the energy absorbing element. The surge protector further includes a connection unit connected to the second contact, the connection unit configured to be in a first position when the thermal spacing unit is in a first physical state and a second position when the thermal spacing unit is in a second physical state, such that the electrical current travelling from the first contact to the second contact via the energy absorbing element is interrupted when the connection unit is in the second position. The surge protector further includes a biasing element connected to the connection unit, the biasing element configured to urge the connection unit from the first position to the second position. The thermal spacing unit prevents the connection unit from moving from the first position to the second position.

Also described is a surge protector providing protection during a surge event. The surge protector includes a first contact being electrically conductive and having a cavity defined by four walls and a bottom surface. The surge protector further includes a second contact being electrically conductive and having a contact surface on a bottom side and a track having a first end and a second end along an axis on a top side. The surge protector further includes a metal oxide varistor configured to absorb energy and release absorbed energy as heat, the metal oxide varistor having a first contact surface and a second contact surface, the first contact surface of the metal oxide varistor contacting the first contact and the second contact surface of the metal oxide varistor contacting the second contact, such that electrical current travels from the first contact to the second contact via the metal oxide varistor. The surge protector further includes a thermal bulb contacting the metal oxide varistor, the thermal bulb configured to be in an unbroken state or a broken state based on a temperature of the metal oxide varistor. The surge protector further includes a connection unit located within the track of the second contact, the connection unit configured to slide along the axis in the track, and be in a first position when the thermal bulb is in an unbroken state and a second position when the thermal bulb is in a broken state, the connection unit establishing a direct connection between the first contact and the second contact when the connection unit is in the second position, such that the electrical current travelling from the first contact to the second contact via the metal oxide varistor is interrupted. The surge protector further includes a spring located in the track of the second contact in a direction along the axis, the spring connected to the connection unit and configured to urge the connection unit from the first position to the second position. The thermal bulb, when in the unbroken state, prevents the connection unit from moving from the first position to the second position.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

A surge protection device (or "surge protector") may be used to protect electrical components from damage. In some embodiments, the designed failure mode of the surge protector includes a triggering of an open circuit, and in other embodiments, the designed failure mode of the surge protector includes a triggering of a short circuit. The triggering of the open circuit or the short circuit may prevent components from prolonged exposure to an unsafe condition (e.g., a power surge/over voltage). The surge protector may include one or more elements, such as a metal oxide varistor (MOV) for absorbing potentially destructive energy.

The surge protector with the MOV may be arranged in conjunction with a device to be protected. At safe voltage levels, the MOV has a high resistance, relative to the resistance of the device to be protected. Therefore, current does not reach the MOV, and the device to be protected may function normally. However, at high voltage levels, the resistance of the MOV becomes zero or near-zero, and the current passes through the MOV instead of the device to be protected, protecting the device to be protected from high voltage surges. Most of the surge energy is passed to ground. The current passes through the MOV since it has a much lower impedance than the equipment being protected. When an MOV fails (whether by chronic degradation from small surges or acute failure from a large surge), its resistance will increase or rise, leading to dissipation of heat during a surge, or even at normal operating voltages.

Figure 1A:
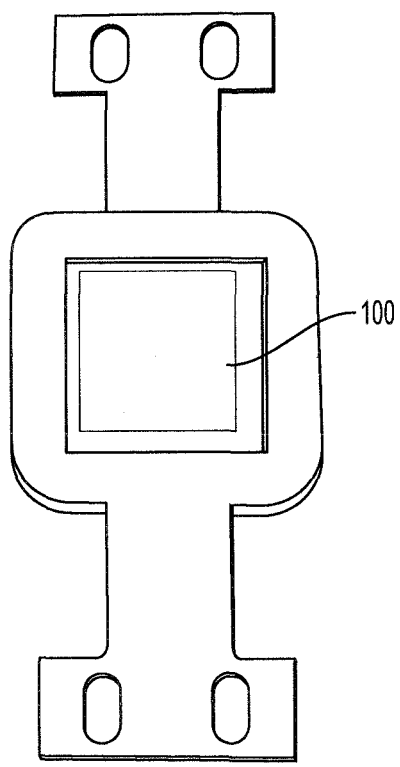
FIG. 1A illustrates a metal oxide varistor (MOV) that includes a thermally activated switching element, according to an embodiment of the present invention.
Figure 1B:
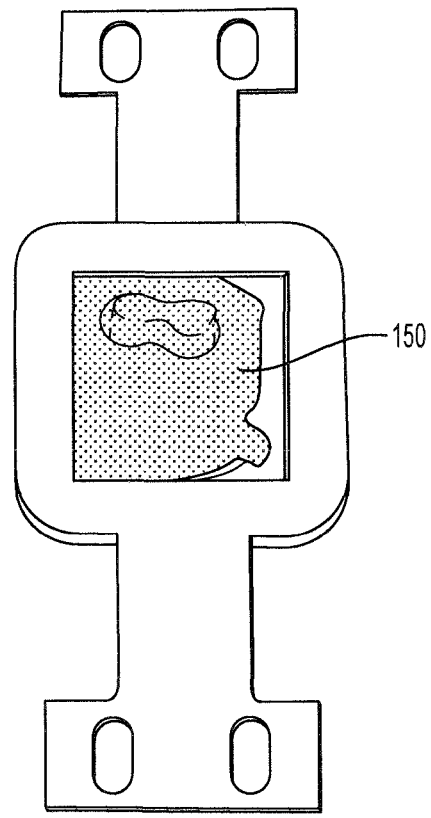
FIG. 1B illustrates an MOV that does not include a thermally activated switching element, according to an embodiment of the present invention.

Over time or at extremely high power levels, energy absorbing elements, such as MOVs, may be compromised. When the energy absorbing elements are compromised, they may become so overheated that they catch on fire, damage components in the vicinity, and components normally protected from voltage surges may be damaged as well. FIG. 1A illustrates an MOV 100 that is thermally switched. FIG. 1B illustrates an MOV 150 that is not thermally switched. By thermally switching the MOV, situations where MOVs reach extreme temperatures may be avoided.

Figure 2A:
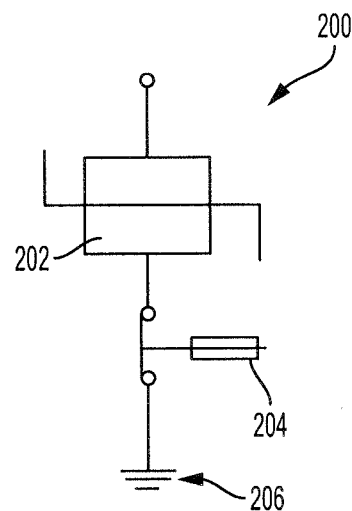
FIG. 2A illustrates a diagram of a surge protector having a fail open configuration, according to an embodiment of the present invention.

FIG. 2A illustrates a diagram of a surge protector 200 which includes an energy absorbing element, such as an MOV 202, a thermal disconnect 204, and a ground connection 206. Under normal operating conditions, the thermal disconnect 204 is not triggered. However, when the MOV 202 absorbs a sufficient amount of energy and produces a sufficient amount of heat, the thermal disconnect 204 is triggered. When the thermal disconnect 204 triggers, the circuit opens and damage to electrical components is prevented. In addition, the MOV 202 is prevented from reaching temperatures high enough to cause damage, such as temperatures high enough to cause the MOV 202 to catch fire. Because the circuit is opened when the MOV 202 reaches a particular temperature, the surge protector 200 may be referred to as operating in a fail open mode.

Figure 2B:
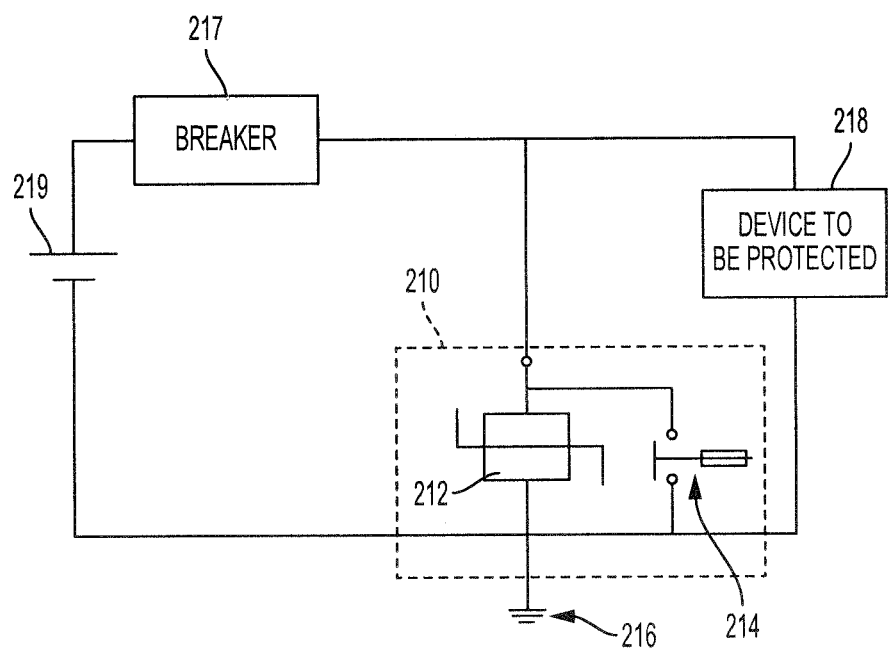
FIG. 2B illustrates a diagram of a surge protector having a fail short configuration, according to an embodiment of the present invention.

FIG. 2B illustrates a surge protector 210 which also includes an energy absorbing element, such as an MOV 212

(similar to MOV 202), a thermal disconnect 214 (similar to thermal disconnect 204), and a ground connection 216 (similar to ground connection 206). In some embodiments, the surge protector 210 is connected to an upstream breaker 217, a power source 219, and connected in parallel with a device to be protected 218. When the MOV 212 absorbs energy and reaches/nears a critical temperature, the thermal disconnect 214 triggers. When the thermal disconnect 214 triggers, a short circuit is completed around the MOV 212. When the short circuit is completed around the MOV 212, the upstream breaker 217 is tripped, causing power from the power source 219 to the device to be protected 218 to be interrupted. Because a short circuit is created when the MOV 212 reaches a particular temperature, the surge protector 200 may be referred to as operating in a fail short mode.

Figure 2C:
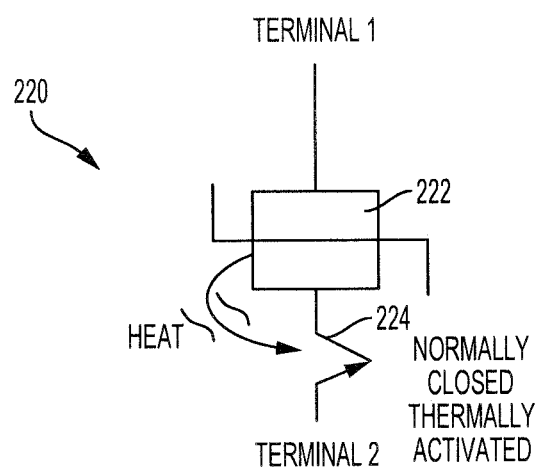
FIG. 2C illustrates another diagram of a surge protector having a fail open configuration, according to an embodiment of the present invention.

FIG. 2C illustrates a surge protector 220 similar to the surge protector 200 operating in a fail open mode. The MOV 222 generates heat, which triggers the thermal disconnect 224 to transition from a closed position to an open position.

Figure 2D:
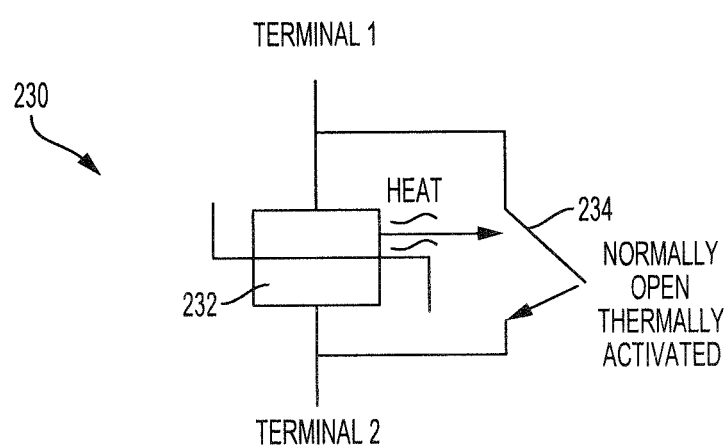
FIG. 2D illustrates another diagram of a surge protector having a fail short configuration, according to an embodiment of the present invention.

FIG. 2D illustrates a surge protector 230 similar to the surge protector 210 operating in a fail short mode. The MOV 232 generates heat, which triggers the thermal disconnect 234 to transition from an open position to a closed position, thereby creating a short circuit.

A thermal disconnect (e.g., thermal disconnect 204, 214, 224, 234) may be any mechanism which opens or closes based on temperature. In some embodiments, the thermal disconnect includes use of a low temperature solder, which may melt at a particular temperature as a result of heat from the energy absorbing element, such as an MOV. When the low temperature solder melts, a connection may be broken (resulting in the fail open configurations shown in FIGS. 2A and 2C) or a connection may be created (resulting in the fail short configurations shown in FIGS. 2B and 2D). In some embodiments, the thermal disconnect includes use of a thermal bulb, such as those found in emergency fire suppression sprinkler systems. The thermal bulb is configured to break when the fluid within the thermal bulb reaches a particular temperature. When the thermal bulb breaks, a connection may be broken or a connection may be created, depending on the configuration of the thermal switch.

Figure 3A:
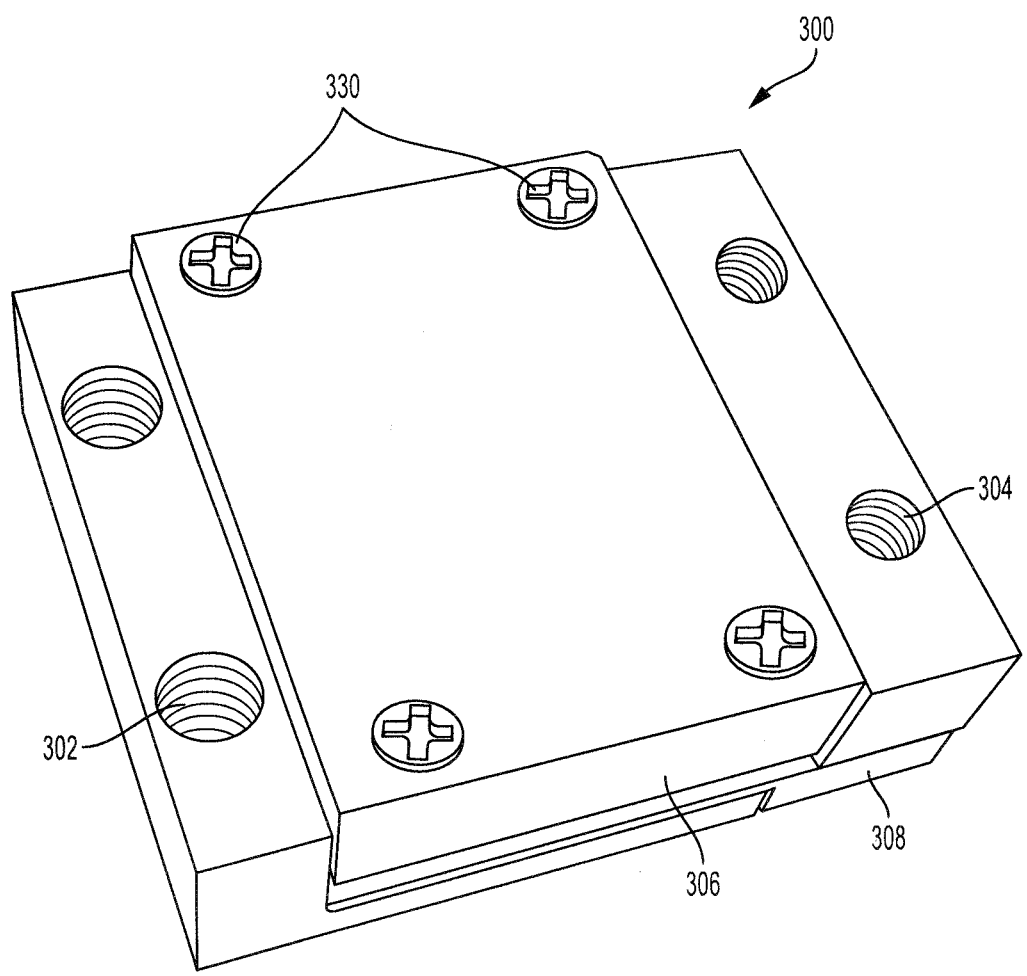
FIG. 3A is a perspective view of a surge protector, according to an embodiment of the present invention.

FIG. 3A illustrates a perspective view of a surge protector 300. Any of the surge protectors described herein (e.g., surge protector 300, 400, or 500) may be used in any application where surge protection of sensitive equipment is desired, including, for example, telephone systems and computing warehouses. Any of the surge protectors described herein may also be used in direct current (DC) systems or alternating current (AC) systems.

The surge protector 300 has a first contact 302 and a second contact 304. As will be illustrated herein, the first contact 302 and the second contact 304 are connected via an energy absorbing element, such as an MOV, in a normal operating configuration, and the first contact 302 and the second contact 304 are directly connected in a fail short configuration, when the energy absorbing element has exceeded a predetermined threshold temperature. The first contact 302 and the second contact 304 may be made of an electrically conductive material, such as metal or a metal alloy. The metal or metal alloy may be one or more of copper, brass, aluminum, or any metal or alloy commonly used in electrical devices. Tin plating or another suitable conductive protective plating may be used.

The surge protector 300 also includes an intermediate insulation member 308 and a unit insulation member 306. The insulation members 306, 308 may be made of an insulating material, such as ceramic or plastic. The insulation members 306, 308 may be located in and around the surge protector 300 where the first contact 302 and the second contact 304 are connected via the energy absorbing element (e.g., MOV) in a normal operating configuration. The insulation members 306, 308 may also be located in and around the surge protector 300 where the first contact 302 and the second contact 304 become directly connected in a fail short configuration. The multiple layers of the surge protector 300 may be secured by one or more securing devices 330, such as screws, pins, or bolts.

Figure 3B:
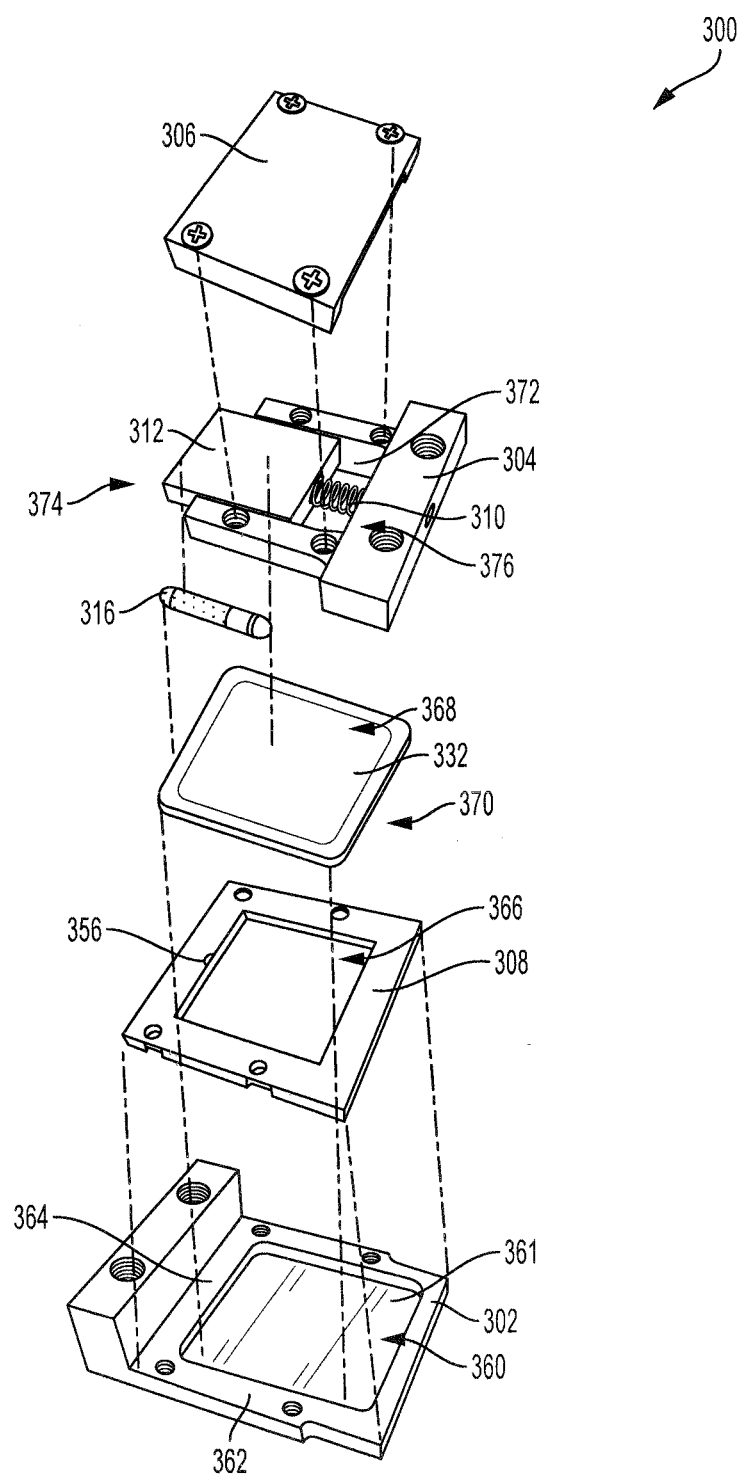
FIG. 3B is an exploded view of the surge protector, illustrating the various elements of the surge protector, according to an embodiment of the present invention.

FIG. 3B illustrates an exploded view of the surge protector 300. At the top of the surge protector 300 is the unit insulation member 306. At the base of the surge protector 300 is a first contact 302. The first contact 302 may have a generally square or rectangular shape. The first contact 302 may include a first contact cavity 360. The first contact cavity 360 may be substantially the same shape as the first contact 302 (e.g., square or rectangular) and may be bounded by four walls 362. The first contact cavity 360 may be defined by one or more walls 362 and a bottom surface 361 of the first contact cavity 360.

The intermediate insulation member 308 may be located above the first contact 302. The intermediate insulation member 308 may also have a substantially similar shape as the first contact 302, and may be located on top of the walls 362 of the first contact 302 surrounding the first contact cavity 360. The intermediate insulation member 308 may also have a notch 356 for partially receiving the thermal spacing unit (e.g., a thermal bulb 316). The first contact 302 may also include a corresponding notch 364 for partially receiving the thermal bulb 316. The intermediate insulation member 308 may also include an opening 366 corresponding to the first contact cavity 360 of the first contact 302.

The energy absorbing unit, such as an MOV 332, may be located within the first contact cavity 360 of the first contact 302. The MOV 332 may be located within the opening 366 of the intermediate insulation member 308. The MOV 332 has a first contact side 370 and a second contact side 368. The first contact side 370 contacts the first contact 302. In particular, the first contact side 370 of the MOV 332 contacts a surface of the first contact 302 within the first contact cavity 360 (e.g., the bottom surface 361 of the first contact cavity 360). In FIG. 3B, the first contact side 370 is on the bottom side of the MOV 332 and is not shown. The second contact side 368 contacts the second contact 304. In particular, the second contact side 368 of the MOV 332 contacts a bottom surface of the second contact 304.

The thermal bulb 316 is located on at least a portion of the second contact side 368 of the MOV 332. The thermal bulb 316 is configured to be in a first physical state or a second physical state based on a temperature of the MOV 332. For example, the thermal bulb 316 may contain a fluid which expands when heated and causes the thermal bulb 316 to break when the temperature of the fluid exceeds a threshold temperature due to the stresses imparted on the bulb by the fluid's expansion. The fluid temperature may rise based on the temperature of the MOV 332. Thus, when the MOV 332 exceeds a threshold temperature, the thermal bulb 316 will transition from being in a first physical state (e.g., unbroken) to a second physical state (e.g., broken). The transition of the thermal bulb 316 from the first physical state to the second physical state may be highly reliable and rapidly occurring, such that the MOV 332 does not exceed the threshold temperature for an appreciable amount of time, if at all.

In some embodiments, the thermal bulb 316 contracts when heated. In these embodiments, the thermal bulb may be made of a flexible material and may contain a material which contracts when heated. That is, when the MOV 332 exceeds the threshold temperature, the thermal bulb 316 will transition from being in a first physical state (e.g., a first size) to a second physical state (e.g., a second size smaller than the first size). The components of the surge protector 300 may be reconfigured to establish a direct connection between the first contact 302 and the second contact 304 when the thermal bulb 316 contracts when heated, as opposed to expanding and breaking.

In other embodiments, the thermal bulb 316 may not break when heated, but may expand as the fluid inside expands. That is, when the MOV 332 exceeds the threshold temperature, the thermal bulb 316 will transition from being in a first physical state (e.g., a first size) to a second physical state (e.g., a second size greater than the first size). The components of the surge protector 300 may be reconfigured to establish a direct connection between the first contact 302 and the second contact 304 when the thermal bulb 316 expands but does not break when heated, as opposed to expanding and breaking. When the thermal bulb 316 expands but does not break, the change in size of the thermal bulb 316 may be relatively small in order to provide a sufficiently rapid response time, such that the MOV 332 does not exceed the threshold temperature for an appreciable amount of time, if at all.

The second contact 304 is located on top of the thermal bulb 316 and the MOV 332. The second contact 304 includes a connection unit 312 which moves along a track 372 of the second contact 304. The track 372 has a first end 374 and a second end 376. The second contact 304 also includes a biasing element (e.g., spring 310) which moves the connection unit 312 within the track 372. The spring 310 is located between the connection unit 312 and a wall on the second end 376 of the track 372. The spring 310 urges the connection unit 312 from the second end 376 toward the first end 374. As will be shown in further detail herein, the thermal spacing unit (e.g., thermal bulb 316) loads the spring 310 such that the connection unit 312 is within the track 372, and held toward the second end 376 of the track 372. When the thermal bulb 316 breaks due to the temperature of the MOV 332, the connection unit 312 is released and the spring 310 urges the connection unit 312 toward the first end 374 of the track 372.

In order to assemble the surge protector 300, the intermediate insulation member 308 may first be placed on top of the first contact 302. The MOV 332 may then be placed within the first contact cavity 360, such that the MOV 332 is within the opening 366 of the intermediate insulation member 308. The thermal bulb 316 may then be placed on top of the MOV 332 and within the recess 326 (shown in FIG. 3D) of the second contact 304. The connection unit 312 may be pushed toward the second end 376 of the track 372 and against the force of the spring 310, such that the thermal bulb 316 is substantially within the recess 326. The second contact 304 may be placed on top of the MOV 332 such that a bottom surface of the second contact 304 contacts the second contact side 368 of the MOV 332. The unit insulation member 306 may be placed on top of the second contact 304 covering a portion of the surge protector 300 housing, the MOV 332 and/or the thermal bulb 316, as well as covering a direct connection between the first contact 302 and the second contact 304.

Figure 3C:
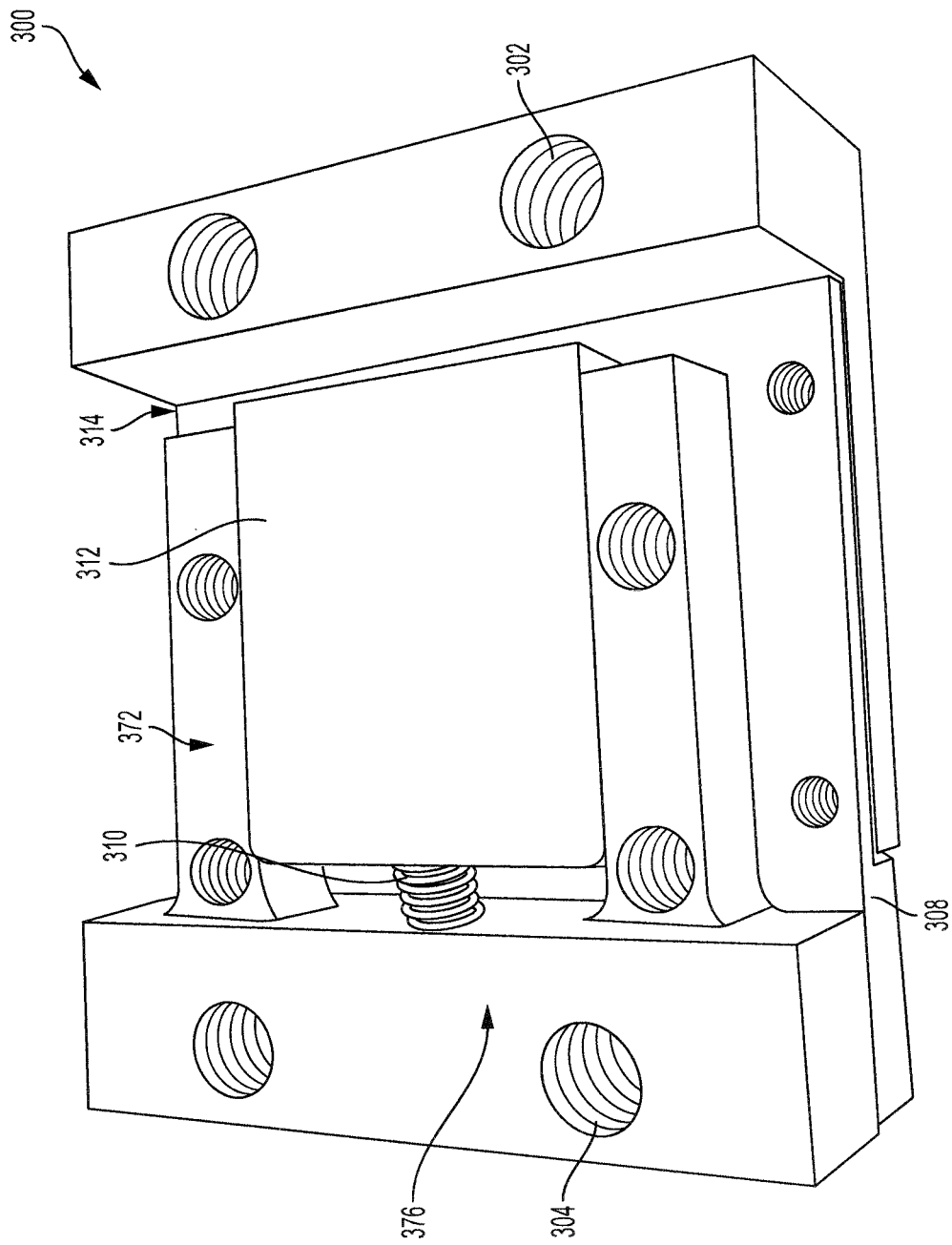
FIG. 3C is a perspective side view of the surge protector, according to an embodiment of the present invention.

FIG. 3C illustrates a perspective view of the surge protector 300 with the unit insulation member 306 removed. As illustrated in FIG. 3B, the surge protector 300 is in a normal operating configuration, with the connection unit 312 in a first, retracted position. In the first position, the spring 310 is compressed and the connection unit 312 is proximate to the second end 376 of the track 372. The first contact 302 and the second contact 304 are connected via an MOV 332, as shown in FIG. 3B. The first contact 302 and the second contact 304 are not directly connected when the surge protector 300 is in the normal operating configuration. However, when the surge protector 300 switches to a fail short configuration, the spring 310 may move the connection unit 312 in a direction (toward the first end 374 of the track 372) such that the first contact 302 and the second contact 304 become directly connected, bridging a gap 314. In the fail short configuration, the connection unit 312 is in a second, extended position.

Figure 3D:
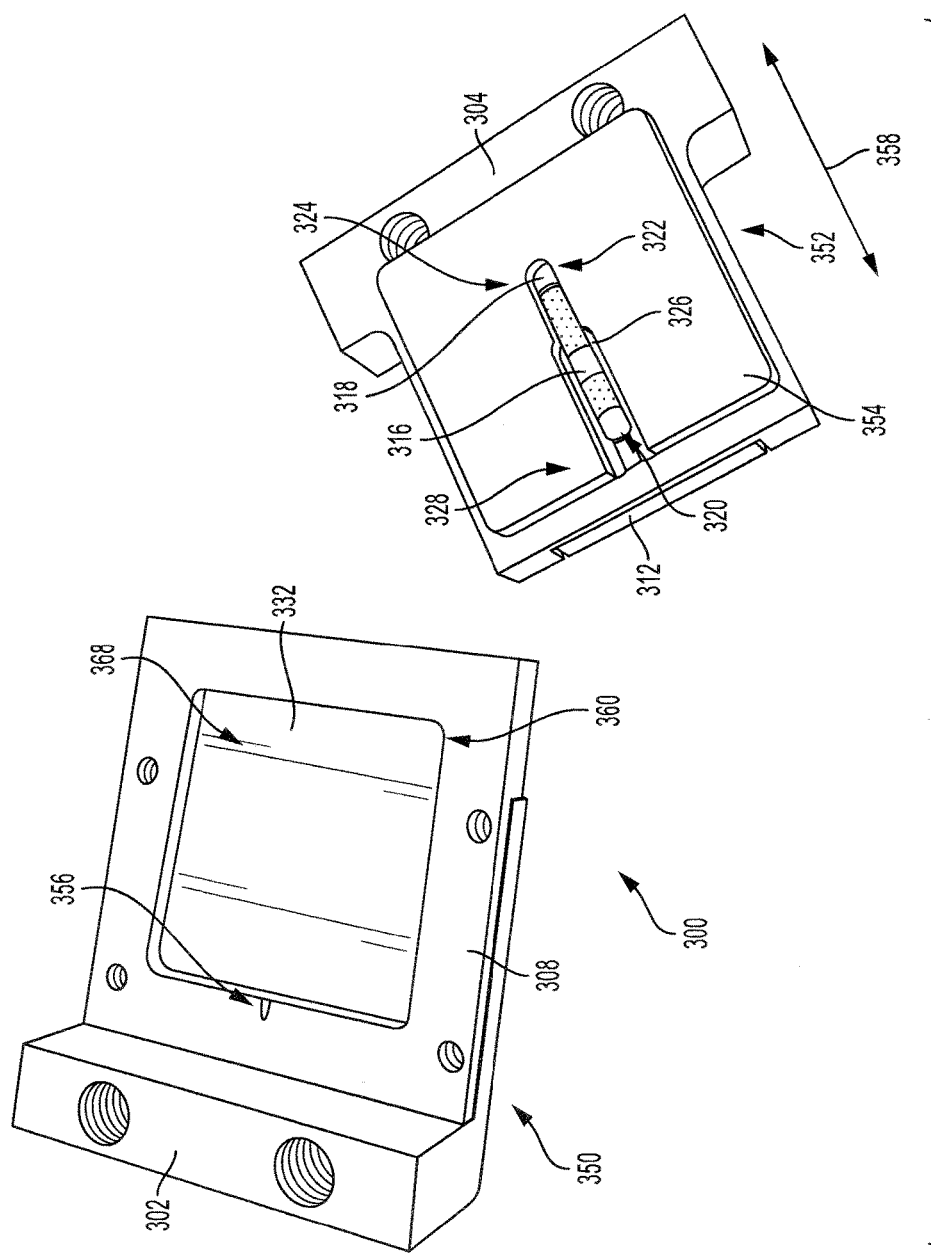
FIG. 3D is a perspective view of the disassembled surge protector in a normal operating configuration, according to an embodiment of the present invention.

FIG. 3D is a perspective view of the surge protector 300 in a disassembled form. The first contact 302 is part of a base unit 350. The base unit 350 may include the first contact 302, the intermediate insulation member 308, and the MOV 332. The base unit 350 includes the first contact cavity 360 for receiving the MOV 332 and a top unit 352.

The second contact 304 is part of the top unit 352. The bottom side of the top unit 352 is shown. That is, when the top unit 352 is assembled with the base unit 350 (as shown in FIG. 3B), the portion of the top unit 352 shown in FIG. 3D contacts the portion of the base unit 350 also shown in FIG. 3D. In particular, the contact surface 354 of the second contact 304 contacts the second contact side 368 of the MOV 332.

The second contact 304 includes a recess 326 for receiving a thermal bulb 316. The recess 326 has a first recess end 328 and a second recess end 324. The first recess end 328 is proximate to the first contact 302 and the second recess end 324 is farther away from the first contact 302 than the first recess end 328. The first recess end 328 corresponds to the first end 374 of the track 372, and the second recess end 324 corresponds to the second end 376 of the track 372. The thermal bulb 316 has a first end 320 proximate to the first contact 302 and a second end 322 farther away from the first contact 302 than the first end 320. The recess 326, the thermal bulb 316, the track 372, and the connection unit 312 are along a longitudinal axis 358. As the connection unit 312 slides along longitudinal axis 358, the thermal bulb 316 may also move along the longitudinal axis 358.

In FIG. 3D, the connection unit 312 is in a first, retracted position and the spring 310 is compressed. The thermal bulb 316 is disposed substantially within the recess 326 of the second contact 304. In some embodiments, the thermal bulb 316 does not extend past the first recess end 328 when the connection unit 312 is in the first position. In some embodiments, the first end 320 of the thermal bulb 316 partially extends past the first recess end 328 when the connection unit 312 is in the first position. When the first end 320 of the thermal bulb 316 extends past the first recess end 328, a portion of the thermal bulb 316 may be received in a notch 356 of the base unit 350.

The connection unit 312 also includes a protrusion 318 extending from the connection unit 312 into the recess 326. The presence of the thermal bulb 316 within the recess 326 keeps the connection unit 312 from contacting the first contact 302. When the thermal bulb 316 is entirely in the recess 326 and the top unit 352 is assembled with the base unit 350, the first end 320 of the thermal bulb 316 contacts the notch 356 in the base unit 350. The second end 322 of the thermal bulb 316 contacts the protrusion 318 of the connection unit 312, thereby causing the connection unit 312 to be in the first, retracted position within the top unit 352, achieving the normal operation configuration described herein.

While the thermal bulb 316 is shown as being generally cylindrically shaped, the thermal bulb 316 may be of any shape. Accordingly, the recess 326 may also be of any corresponding shape such that the thermal bulb 316 is received. For example, the thermal bulb 316 may be a sphere, and the recess 326 may be a shape for receiving a sphere. In some embodiments, the spherical shape may be used for a flexible bulb 316 that expands or contracts but does not break, as described herein.

Figure 3E:
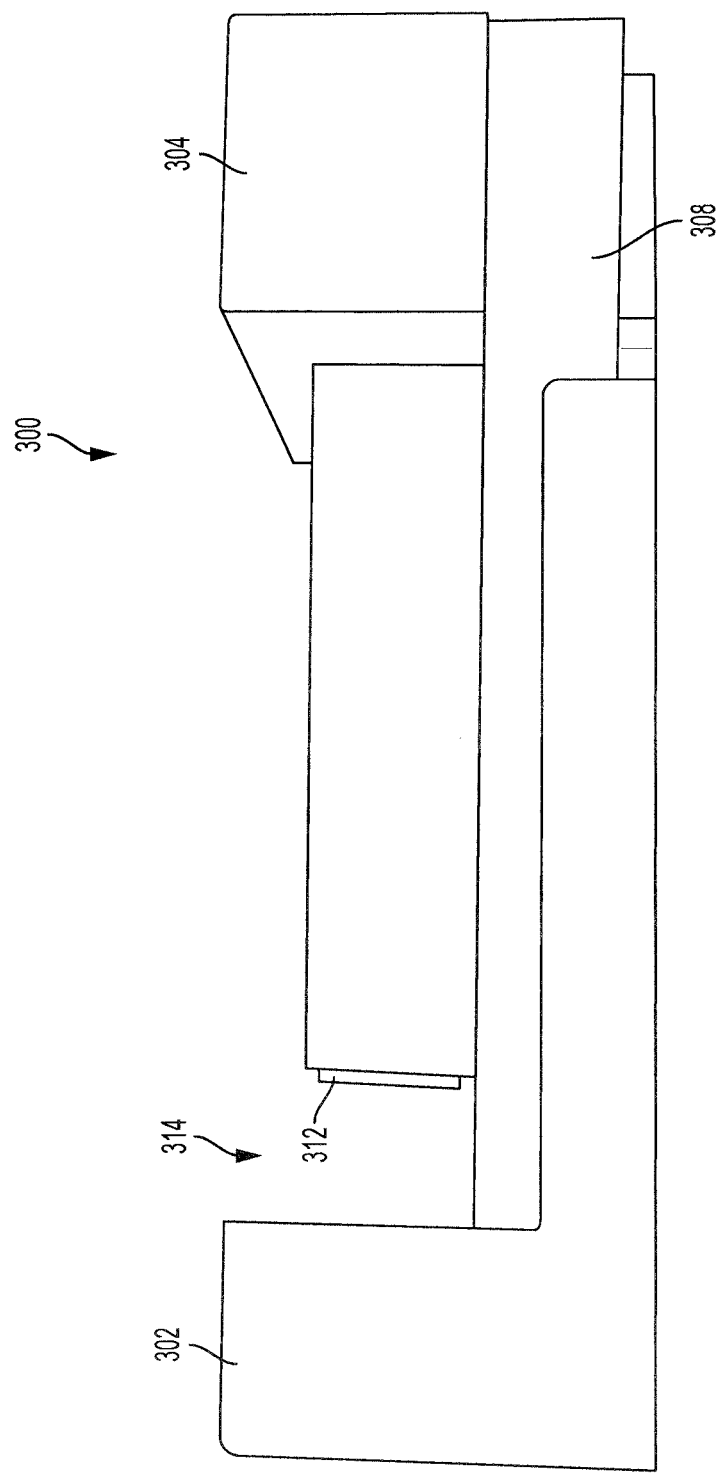
FIG. 3E is a side view of the surge protector in a normal operating configuration, according to an embodiment of the present invention.
Figure 3F:
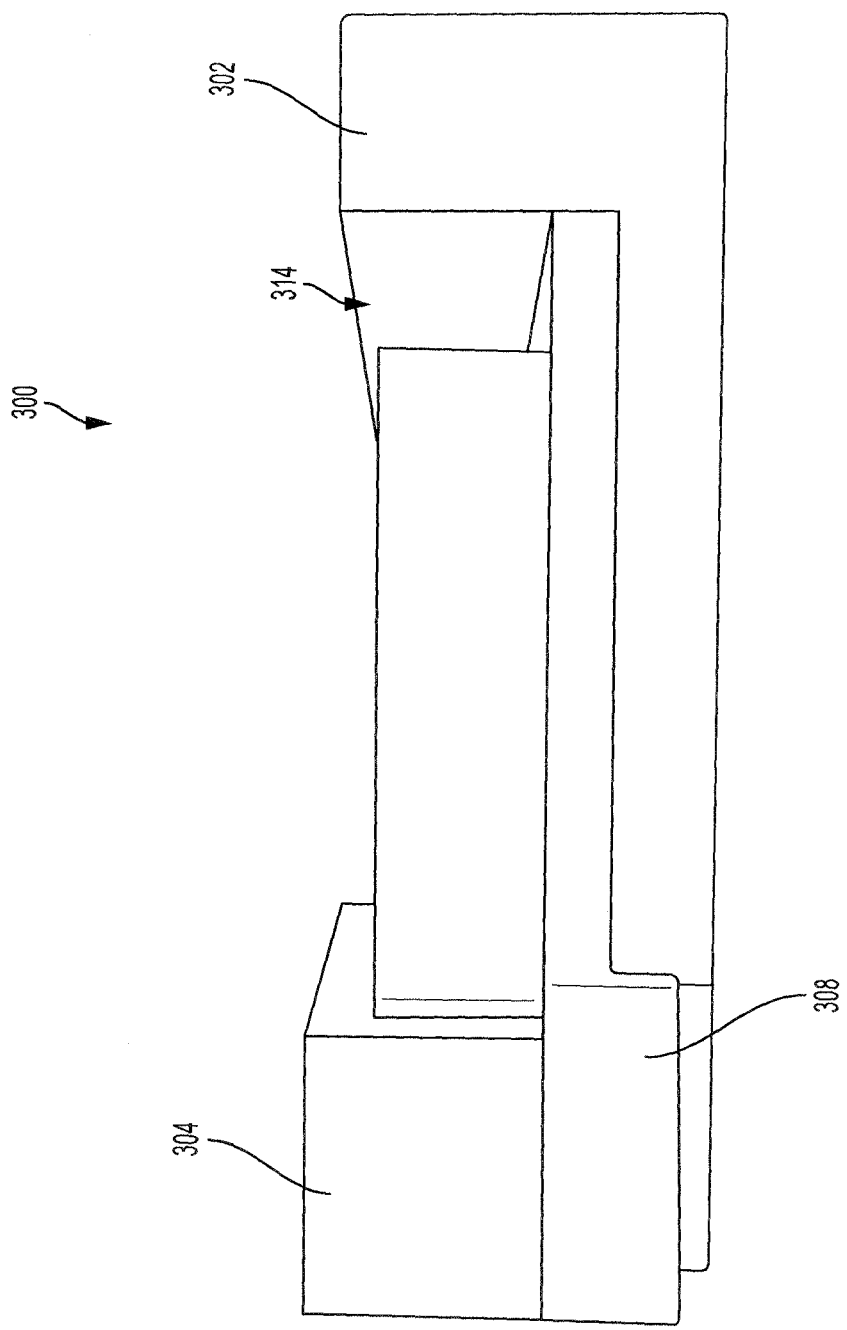
FIG. 3F is another side view of the surge protector in a normal operating configuration, according to an embodiment of the present invention.

FIG. 3E and FIG. 3F are side views of the surge protector 300 in the normal operating configuration with the unit insulation member 306 removed. An internal view of the side view of surge protector 300 is shown in FIG. 3J, showing the various internal elements.

Figure 3G:
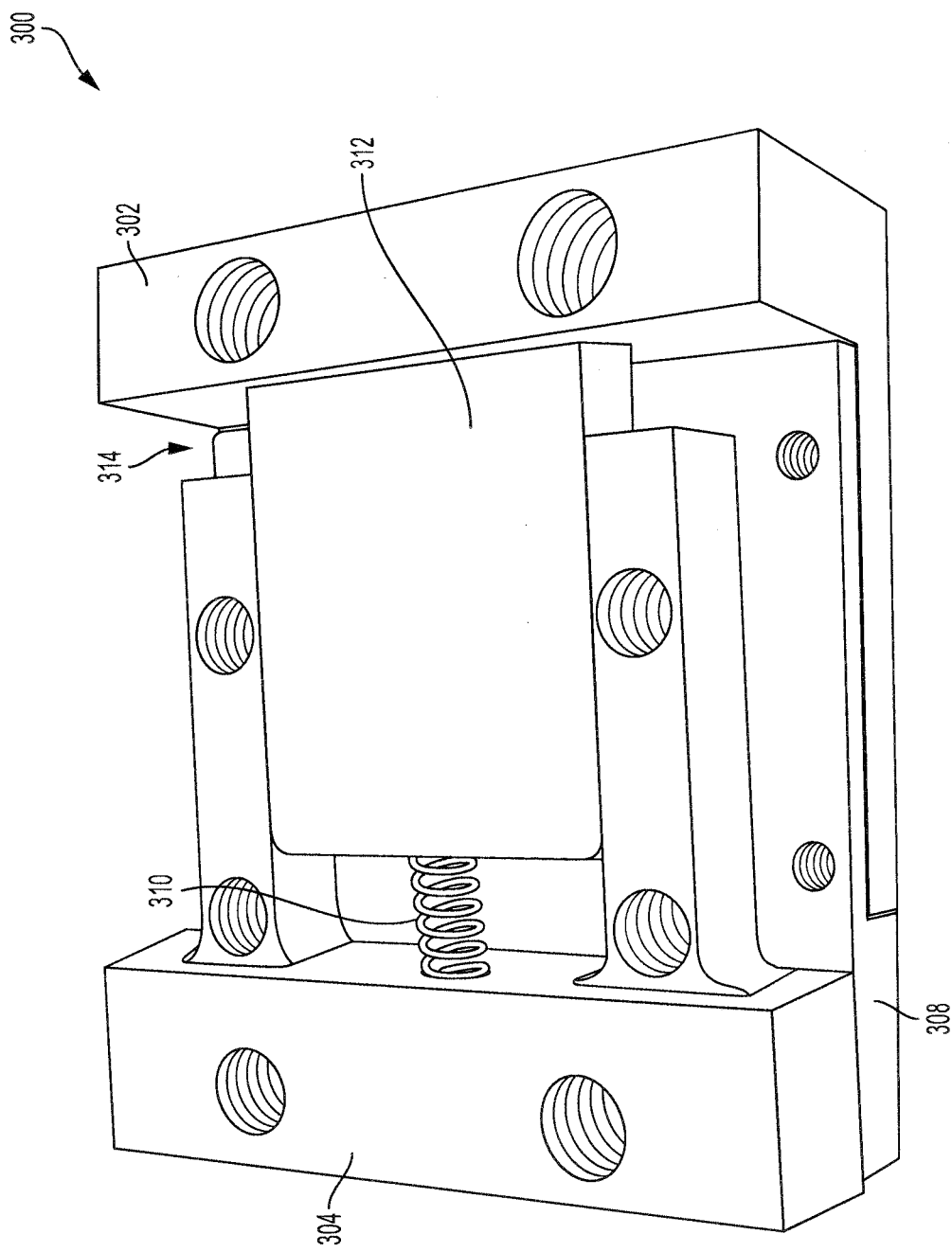
FIG. 3G is a perspective side view of the surge protector, according to an embodiment of the present invention.

FIG. 3G illustrates a perspective view of the surge protector 300 with the unit insulation member 306 removed. As illustrated in FIG. 3G, the surge protector 300 is in a fail short configuration. The first contact 302 and the second contact 304 are directly connected. The spring 310 has urged the connection unit 312 from the first position to the second position, toward the first contact 302. The connection unit 312 now bridges gap 314, as compared to FIG. 3C where the connection unit 312 did not bridge gap 314. While the surge protector 300 is configured such that the connection unit 312 moves toward the first contact 302 in the fail short configuration, in other embodiments, the connection unit 312 may move toward the second contact 304.

Figure 3H:
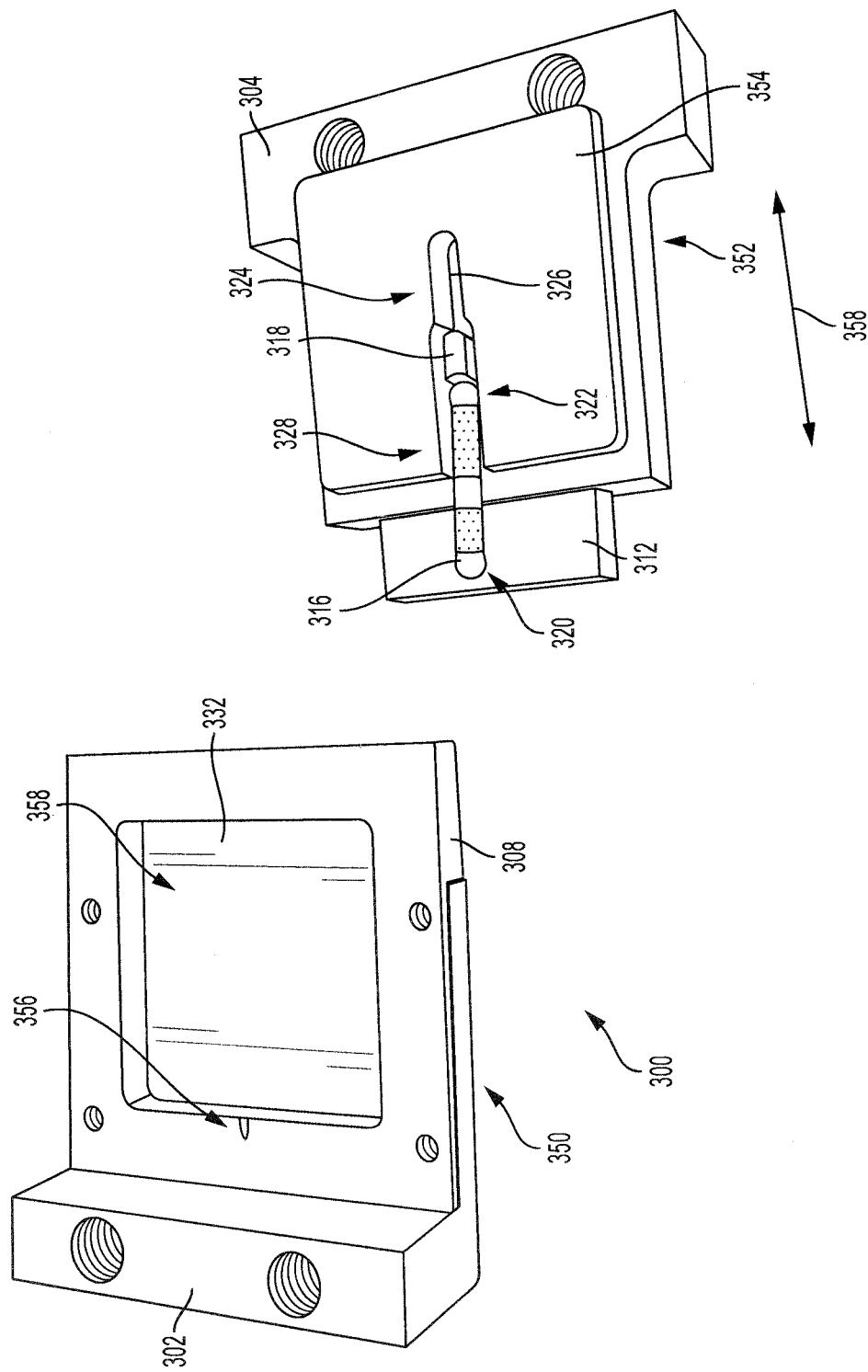
FIG. 3H is a perspective view of the disassembled surge protector in a fail short configuration, according to an embodiment of the present invention.

FIG. 3H is a perspective view of the surge protector 300 in a disassembled form, where the connection unit 312 is in the second, extended position. While the thermal bulb 316 is shown as extending outside of the recess 326 and past the first recess end 328, in operation, the thermal bulb 316 may not be intact when the connection unit 312 is in the second, extended position. Indeed, the thermal bulb's 316 breaking due to the temperature of the MOV 332 causes the connection unit 312 to be in the second, extended position. The recess 326 may also be configured to contain the broken pieces of the thermal bulb 316 when the thermal bulb 316 is in the second, broken physical state. The recess 326 containing the broken pieces may limit or prevent damage to other components from the broken pieces.

Figure 3I:
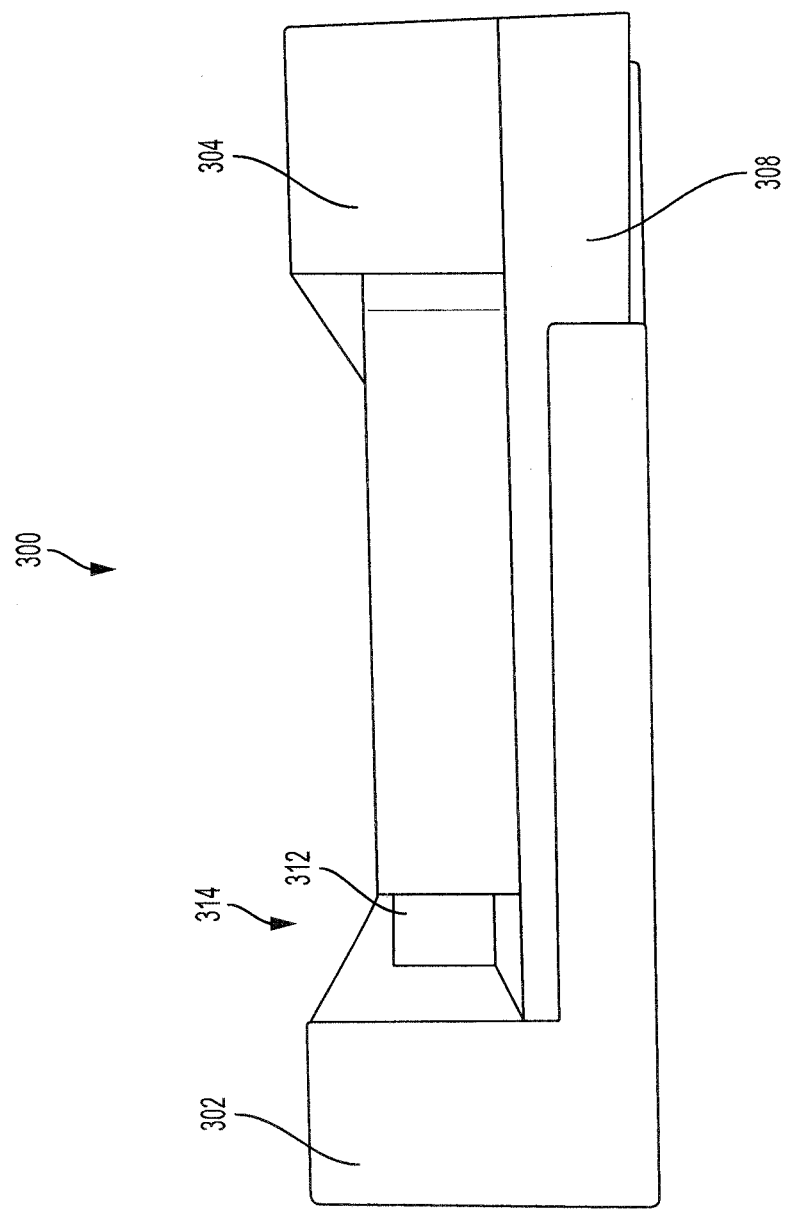
FIG. 3I is a side view of the surge protector in a fail short configuration, according to an embodiment of the present invention.
Figure 3J:
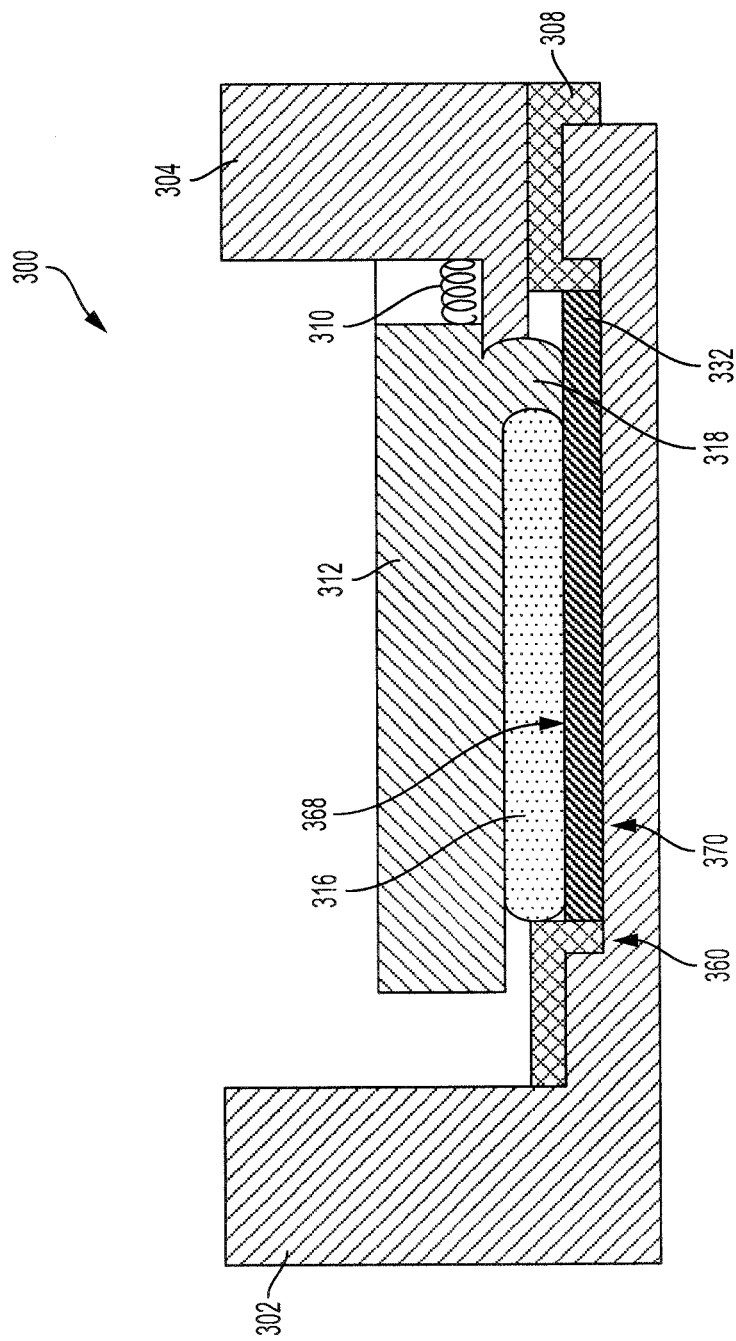
FIG. 3J is a cross-sectional view of the surge protector in a normal operating configuration, illustrating various internal components of the surge protector, according to an embodiment of the present invention.

FIG. 3I is a side view of the surge protector 300 in the fail short configuration with the unit insulation member 306 removed.

FIG. 3J is a side view of the surge protector 300 in the normal operating configuration with the unit insulation member 306 removed. FIG. 3J shows a view of the inside of the surge protector 300.

The first contact 302 is not directly in contact with the second contact 304. The intermediate insulation member 308 separates the first contact 302 from the second contact 304 in various locations, and the MOV 332 also separates the first contact 302 from the second contact 304.

Energy traveling from the first contact 302 to the second contact 304 travels through the first contact 302 to the first contact side 370 of the MOV 332. The energy then travels through the MOV 332, through the second contact surface 368 of the MOV 332, and to the second contact 304. When the MOV 332 is below the temperature threshold, the thermal bulb 316 remains in the first, unbroken physical state.

Figure 3K:
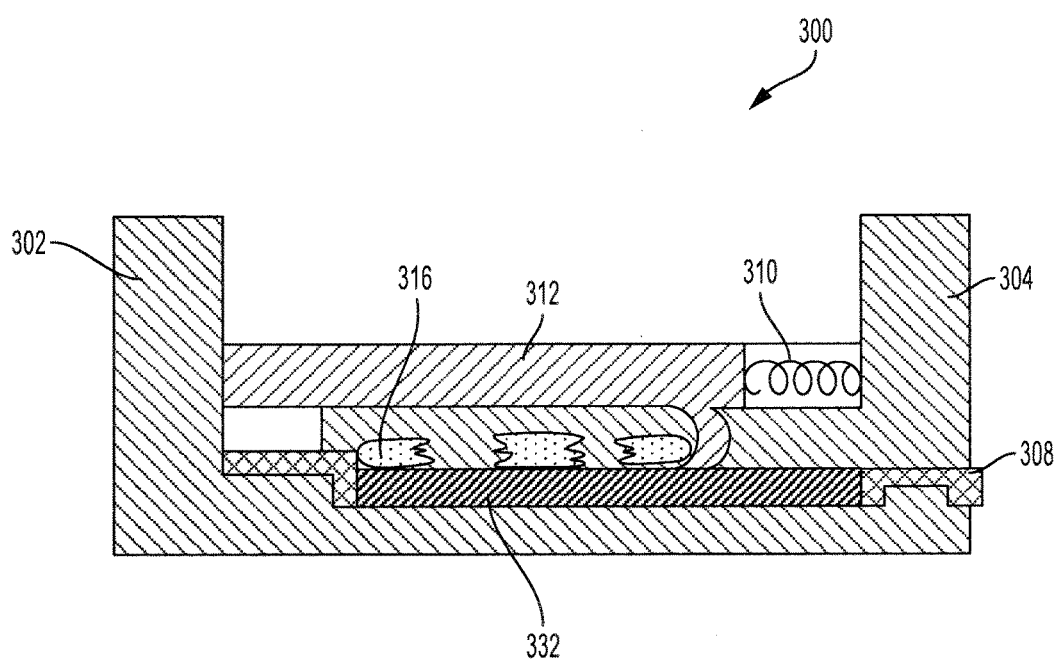
FIG. 3K is a cross-sectional view of the surge protector in a fail short configuration, illustrating various internal components of the surge protector, according to an embodiment of the present invention.
Figure 3L:
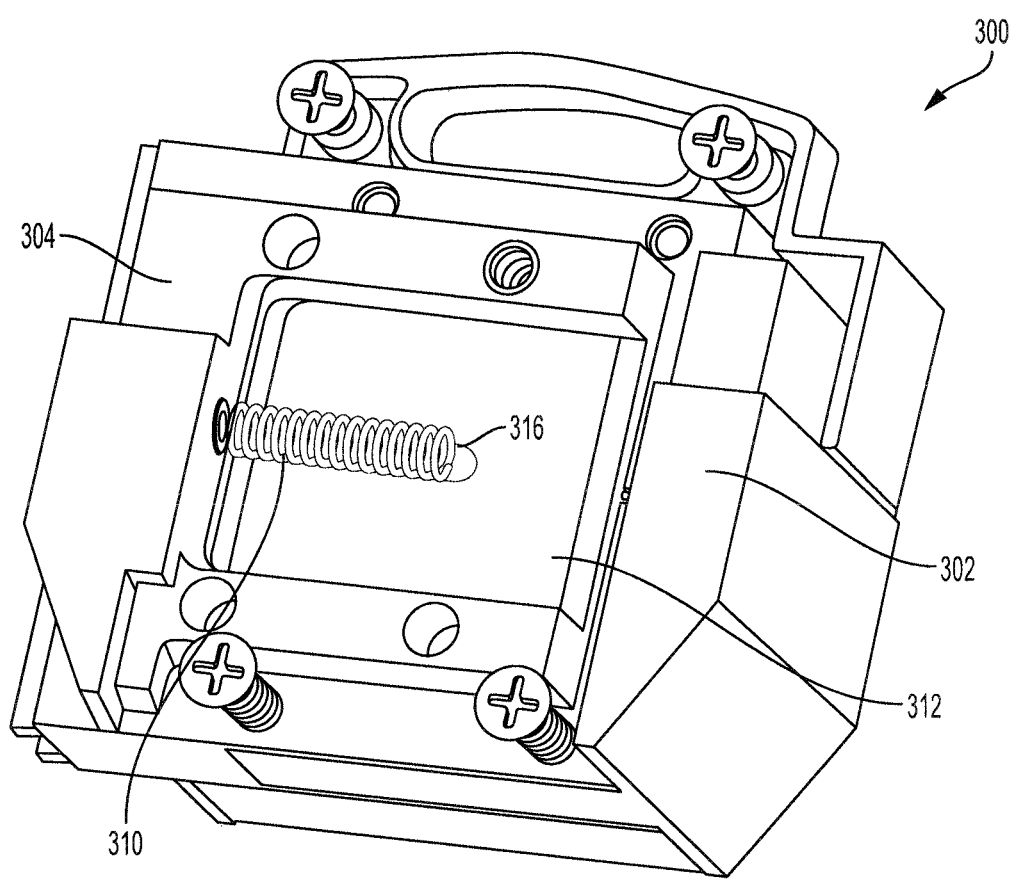
FIG. 3L is a perspective view of the surge protector, illustrating various internal components of the surge protector, according to an embodiment of the present invention.

FIG. 3K is a side view of the surge protector 300 in the fail short configuration with the unit insulation member 306 removed. FIG. 3K shows a view of the inside of the surge protector 300.

The thermal bulb 316 is in the second, broken physical state. Accordingly, the first contact 302 is directly in contact with the second contact 304. Energy traveling from the first contact 302 to the second contact 304 travels through the first contact 302 to the connection unit 312 of the second contact 304. In doing so, electrical current does not travel through the MOV 332. By diverting current away from the MOV 332, further heating of the MOV 332 (and therefore further risk of damage to other components) may be reduced.

While the surge protector 300 is shown as switching from a normal operating configuration to a fail short configuration by the first contact 302 being directly connected to the second contact 304, the surge protector 300 may alternatively switch from a normal operating configuration to a fail open configuration by configuring the components described herein such that a connection between the first contact 302 and the second contact 304 via the MOV 332 is interrupted using the spring 310, resulting in a fail open configuration.

Figure 3M:
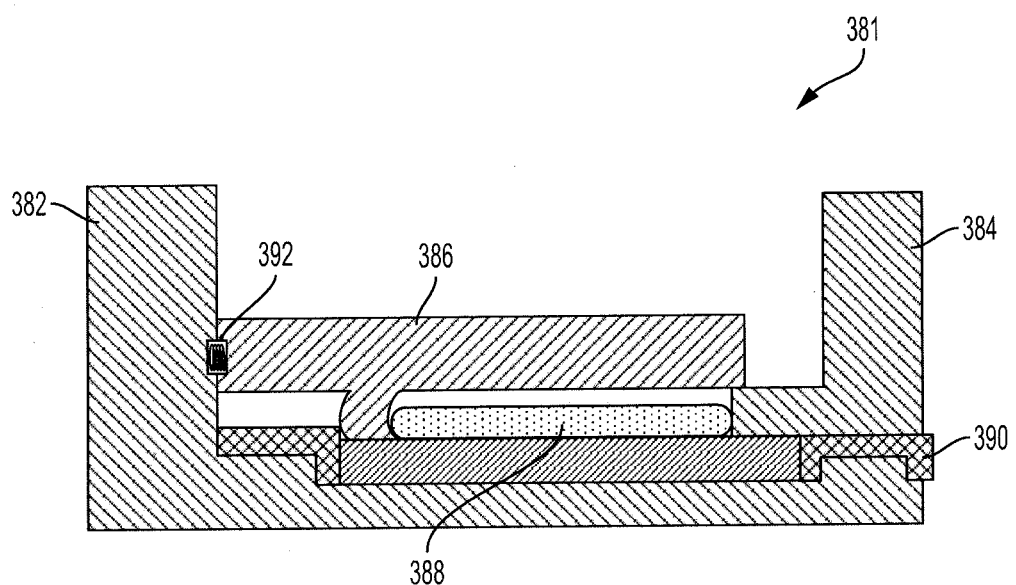
FIG. 3M is a cross-sectional view of a fail open surge protector in a normal operating condition, according to an embodiment of the present invention.
Figure 3N:
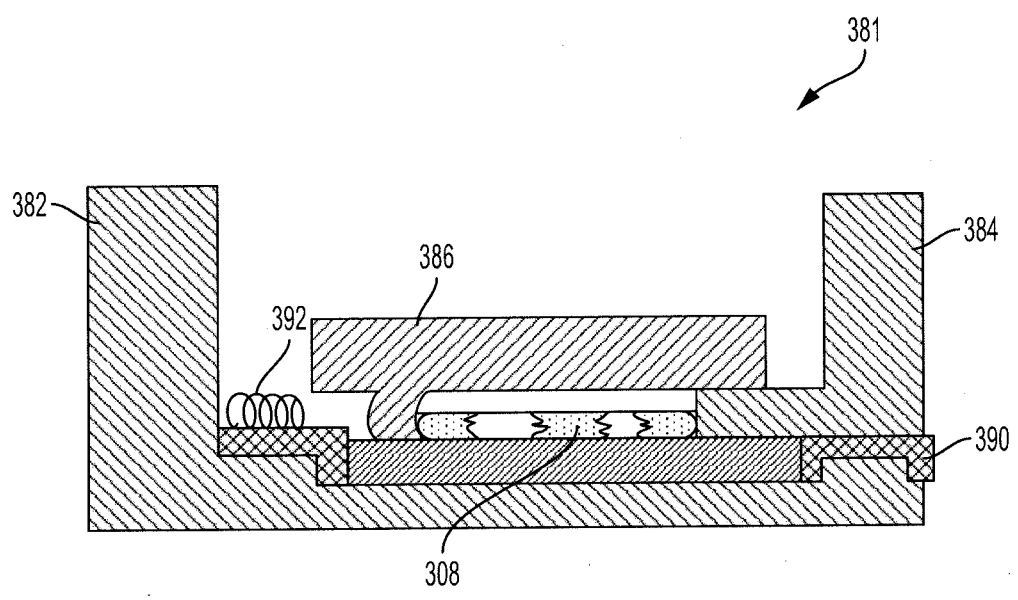
FIG. 3N is a cross-sectional view of a fail open surge protector in a failed operating condition, according to an embodiment of the present invention.

Referring to FIGS. 3M and 3N, a surge protector 381 is shown having a fail open configuration. The surge protector 381 includes a first contact 382 and a second contact 384. The surge protector 381 further includes a connection unit 386, a thermal bulb 388, and an insulation member 308 that operate in a similar manner as the corresponding components of FIGS. 3A-3L. The surge protector 381 further includes a spring 392. As shown in the normal operating condition in FIG. 3M, the thermal bulb 388 is intact and connection between the first contact 382 and the second contact 384 is facilitated via the connection unit 386. However, in response to a sufficient increase in heat, the thermal bulb 388 may fracture, as shown in FIG. 3N. In response, the spring 392 forces the connection unit 386 away from the first contact 382, thus resulting in a fail open condition.

The surge protector 300 of FIGS. 3A-3L includes a connection unit 312 configured to slide along a longitudinal axis 358. However, in other embodiments, a surge protector may include a connection unit configured to connect to a contact by rotating.

Figure 4A:
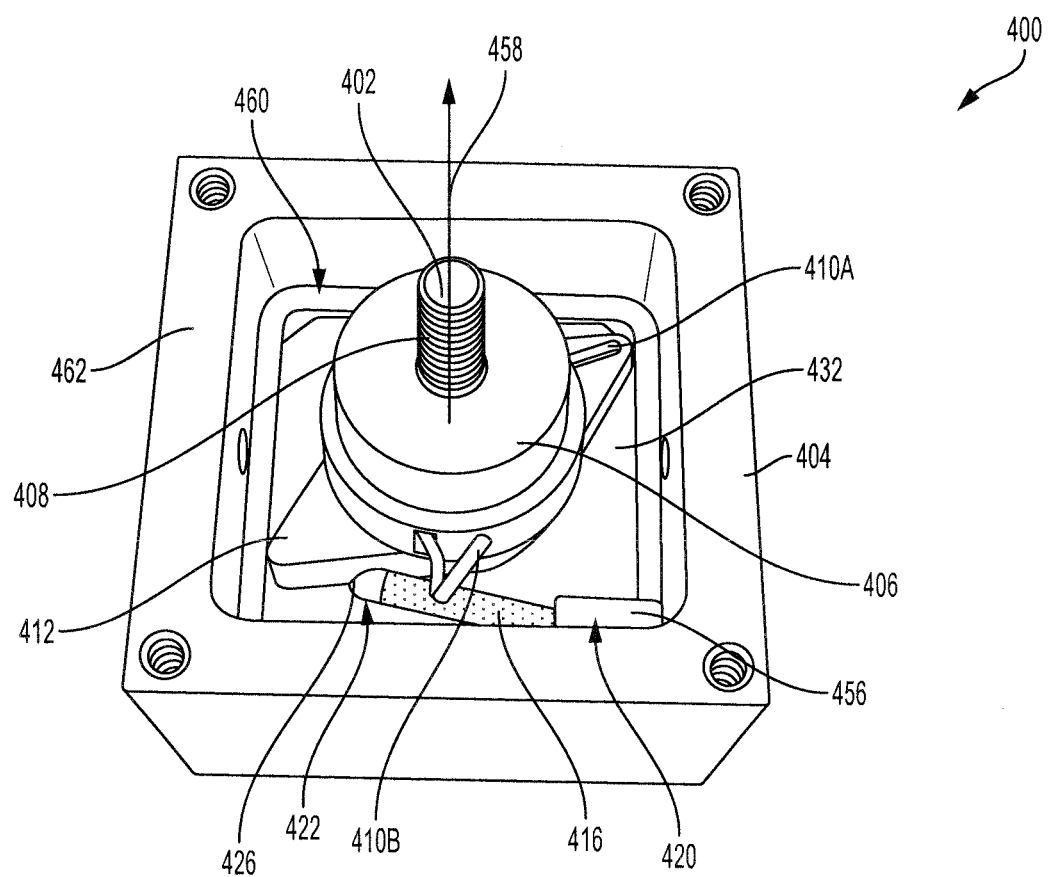
FIG. 4A is a perspective view of a surge protector, according to an embodiment of the present invention.

FIG. 4A illustrates a perspective view of a surge protector 400. The surge protector 400 has a first contact 402 and a second contact 404. The second contact 404 has a generally rectangular horizontal cross-section, and has a cavity 460 defined by four walls 462 and a bottom surface.

The first contact 402 includes a threaded portion 408 and one or more disks 406. The one or more disks 406 may be configured to rotate about a vertical axis 458. The one or more disks 406 are also connected to a connection unit 412. The first contact 402 and the connection unit 412 are located within the cavity 460.

Located below the connection unit 412 is an energy absorbing unit (e.g., metal oxide varistor 432). Similar to the surge protector 300 of FIGS. 3A-3L, the second contact 404 and the first contact 402 are connected via the MOV 432. When the connection unit 412 is in a first position, the first contact 402 and the second contact 404 are not directly connected. When the connection unit 412 is in a second position, the first contact 402 and the second contact 404 are directly connected, as illustrated in FIG. 4C.

The first contact 402 also includes a biasing element (e.g., torsion spring 410). The torsion spring 410 is anchored to the connection unit 412 on one end 410A and anchored to a stationary location on the other end 410B. As illustrated in FIG. 4A, the torsion spring 410 is configured to urge the connection unit 412 to rotate counterclockwise about the vertical axis 458.

The surge protector 400 includes a thermal spacing unit (e.g., thermal bulb 416). The thermal bulb 416 is similar to the thermal bulb 316 of the surge protector 300. The thermal bulb 416 contacts the MOV 432. A portion of the thermal bulb 416 on a first end 420 is located in a bulb holder 456 and a portion of the thermal bulb 416 on a second end 422 is located in a groove 426 of the connection unit 412. The thermal bulb 416 prevents the connection unit 412 from rotating, and therefore from being in the second position. In other words, the thermal bulb 416 opposes or limits the rotational force created by the torsion spring 410. When the thermal bulb 416 breaks from increased temperature of the MOV 432, the connection unit 412 rotates counterclockwise and the connection unit 412 contacts the second contact 404. In particular, the connection unit 412 contacts an inner surface of the wall 462 of the second contact 404.

Figure 4B:
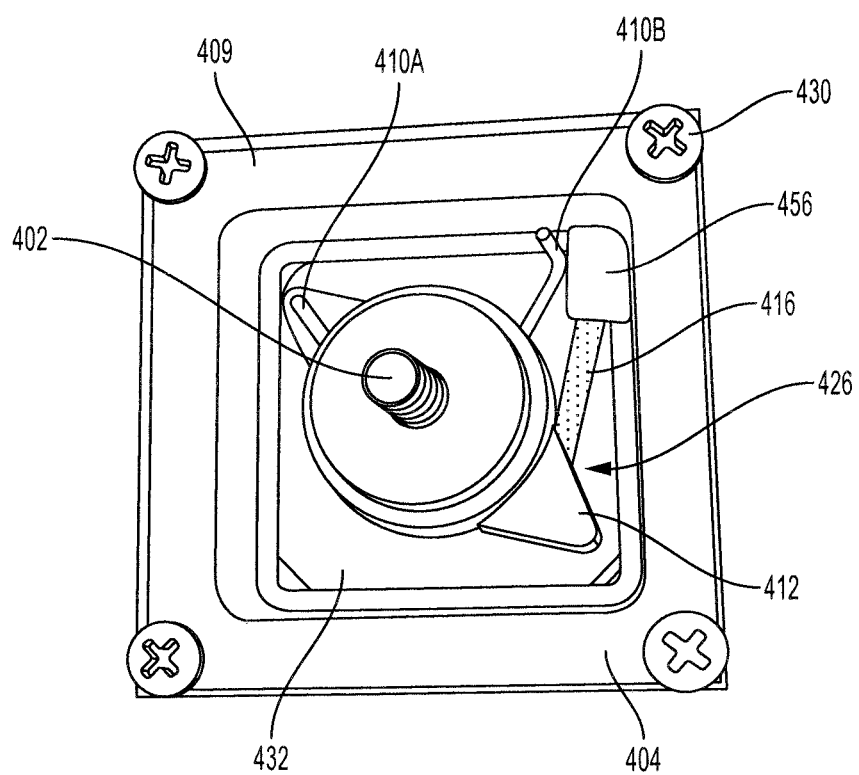
FIG. 4B is a top view of the surge protector, according to an embodiment of the present invention.
Figure 4C:
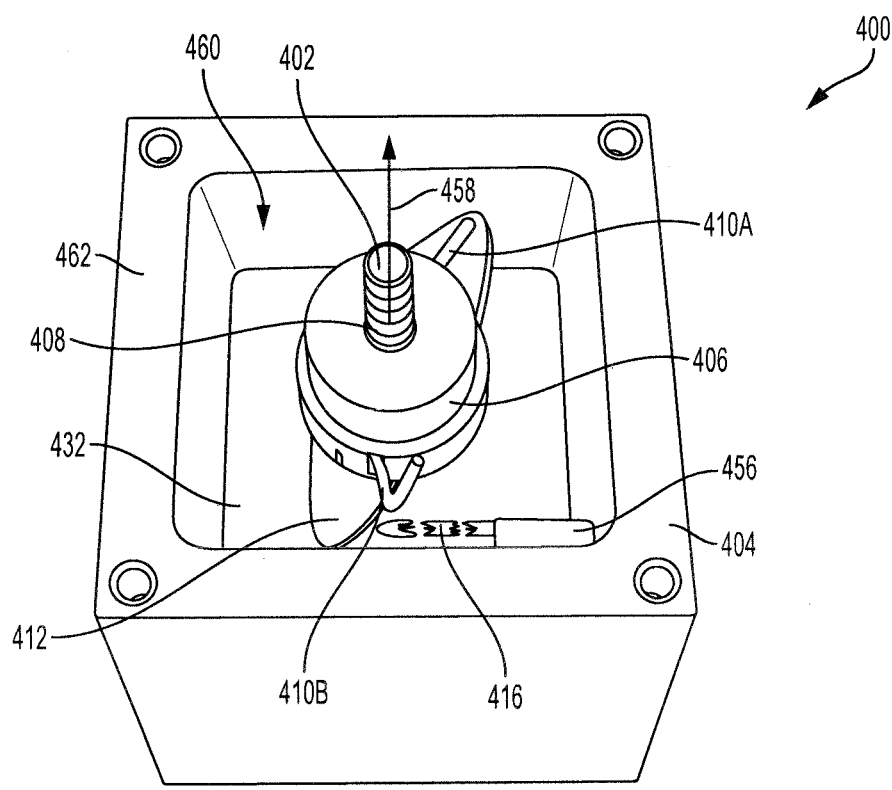
FIG. 4C is a perspective view of the surge protector in a fail short configuration, according to an embodiment of the present invention.

FIG. 4B illustrates a top-down view of the surge protector 400. The surge protector 400 further includes an insulation member 409 secured to the second contact 404 by one or more securing devices 430, such as screws, pins, or bolts. The end 410B of the torsion spring 410 may be connected to the insulation member 409.

FIG. 4C illustrates the connection unit 412 in the second position, such that the second contact 404 is directly connected to the first contact 402. As compared to FIG. 4A, FIG. 4C shows a broken thermal bulb 416, which allows the torsion spring 410 to urge the connection unit 412 to rotate about the vertical axis 458 until the connection unit 412 directly connects to the second contact 404. When the first contact 402 is directly connected to the second contact 404 by the connection unit 412, current does not pass from the first contact 402 to the second contact 404 via the MOV 432.

Figure 4D:
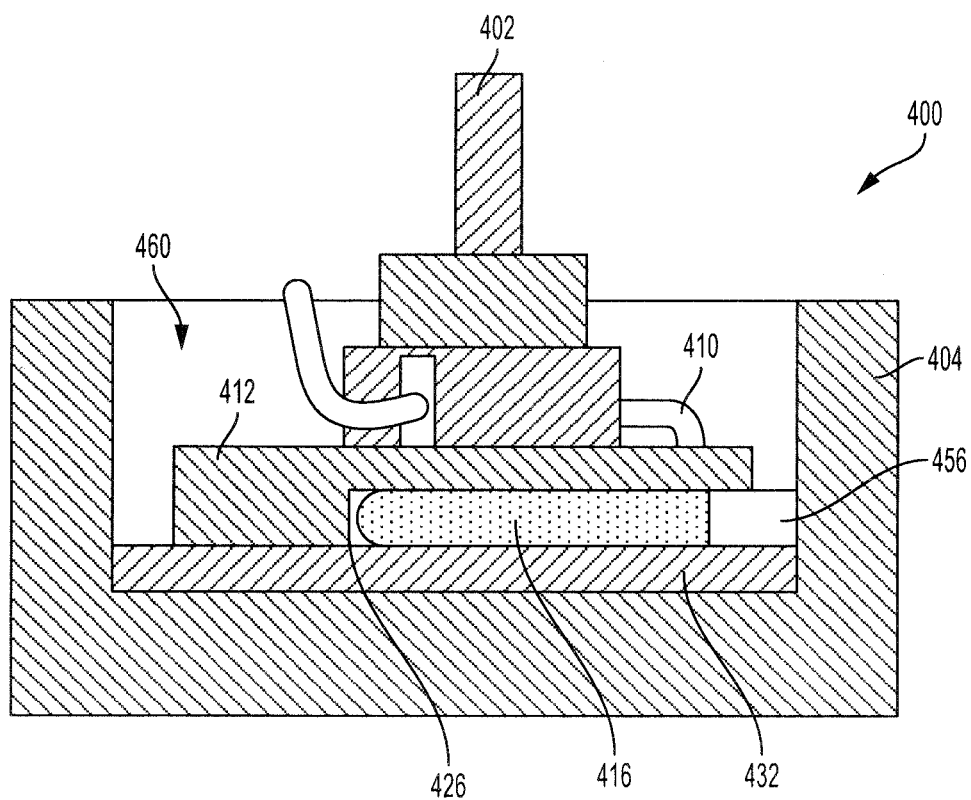
FIG. 4D is a cross-sectional view of the surge protector, illustrating various internal components of the surge protector, according to an embodiment of the present invention.

FIG. 4D is a side view of the surge protector 400, showing a view of the inside of the surge protector 400.

Figure 5A:
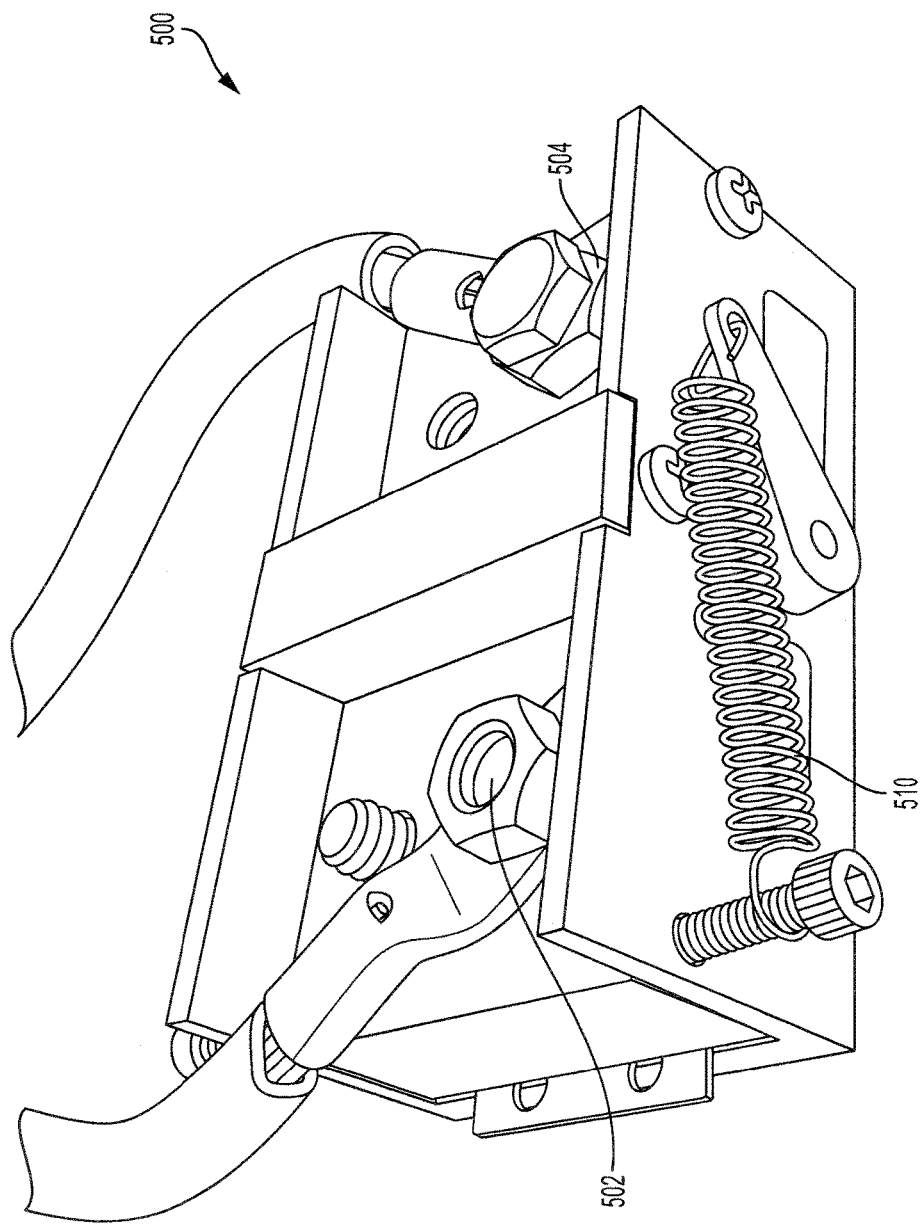
FIG. 5A is a perspective view of a surge protector, according to an embodiment of the present invention.

FIG. 5A illustrates a surge protector 500 according to another embodiment of the invention. A perspective view of the exterior of surge protector 500 is shown. The surge protector 500 has a first contact 502 and a second contact 504, similar to surge protectors 300 and 400 described herein. The surge protector 500 also has a spring 510 which is configured to move a switch within the surge protector 500 when the MOV 532 within the surge protector 500 exceeds a threshold temperature.

Figure 5B:
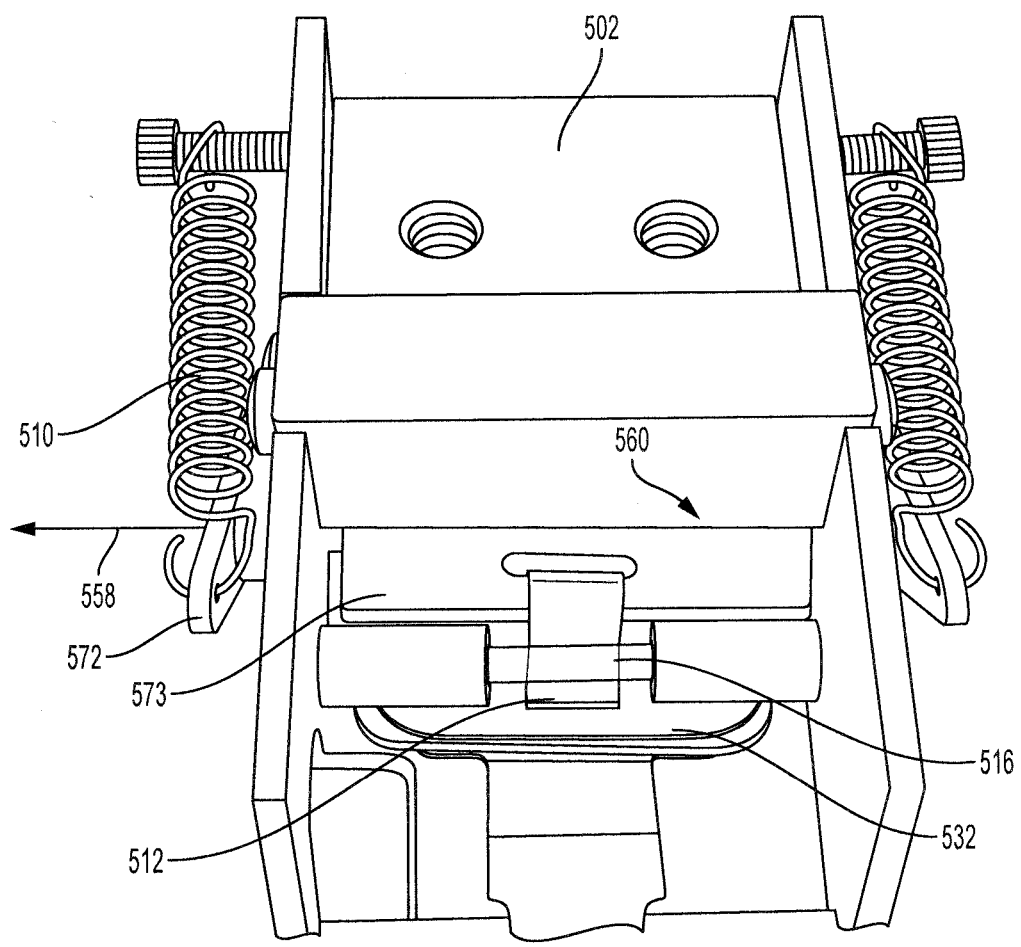
FIG. 5B is a front perspective view of the surge protector, according to an embodiment of the present invention.

FIG. 5B illustrates a view of the interior of surge protector 500. The surge protector 500 has a cavity 560, and within the cavity 560 are an MOV 532, a connection unit 512, and a thermal bulb 516. The thermal bulb 516 is in contact with the MOV 532, and the thermal bulb 516 holds the connection unit 512 in place within the cavity 560. The connection unit 512 is connected to a lever mechanism having an inside component 573 and an outside component 572. The inside component 573 of the lever mechanism is connected to the outside component 572. The spring 510 is connected to the outside component 572 such that the outside component 572 and the inside component 573 are urged in a direction toward the first contact 502, about an axis of rotation 558.

The thermal bulb 516 keeps the connection unit 512 (and therefore the inside component 573 of the lever mechanism) from rotating about the axis of rotation 558. When the MOV 532 exceeds the threshold temperature, the thermal bulb 516 breaks. When the thermal bulb 516 breaks, the connection unit 512 rotates about the axis of rotation 558, urged by the spring 510. The connection unit 512 being released by the thermal bulb 516 breaking may achieve a fail short configuration or a fail open configuration. When the connection unit 512 being released by the thermal bulb 516 breaking achieves a fail short configuration, the connection unit 512 directly connects the first contact 502 with the second contact 504, such that energy bypasses the MOV 532. When the connection unit 512 being released by the thermal bulb 516 breaking achieves a fail open configuration, the circuit is broken and current flowing between the first contact 502 and the second contact 504 is interrupted.

Any of the surge protectors described herein (e.g., surge protector 300, 400, or 500) may be used in any application where surge protection of sensitive equipment is desired, and may also be used in DC systems or AC systems. Any of the surge protectors described herein may be used as part of a power delivery device, such as a power strip. When the surge protector is used in a DC system, the connections may be line to ground, and in an AC system, the connections may be line to ground, line to neutral, or line to line. In some embodiments, an isolator may also be included when the surge protector is used in an AC system. While an MOV is described as an exemplary energy absorbing element, an avalanche diode, such as a silicon avalanche diode may be used.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A surge protector comprising:
a first contact being electrically conductive and having a cavity defined by one or more walls and a bottom surface;
a second contact being electrically conductive and having a contact surface;
an energy absorbing element configured to absorb energy and release absorbed energy as heat, the energy absorbing element having a first contact surface and a second contact surface, the energy absorbing element located within the cavity, the first contact surface of the energy absorbing element contacting the bottom surface of the cavity and the second contact surface of the energy absorbing element contacting the contact surface of the second contact, such that electrical current travels from the first contact to the second contact via the energy absorbing element;
a thermal spacing unit contacting the energy absorbing element, the thermal spacing unit configured to be in a first physical state or a second physical state based on a temperature of the energy absorbing element; and
a connection unit connected to the second contact, the connection unit configured to be in a first position when the thermal spacing unit is in a first physical state and a second position when the thermal spacing unit is in a second physical state, such that the electrical current travelling from the first contact to the second contact via the energy absorbing element is interrupted when the connection unit is in the second position.

2. The surge protector of claim 1, further comprising a biasing element connected to the connection unit, the biasing element urging the connection unit from the first position to the second position, and
   wherein the thermal spacing unit prevents the connection unit from moving from the first position to the second position.

3. The surge protector of claim 2, wherein the second contact includes a track having a first end and a second end along an axis,
   wherein the connection unit is located within the track, and is configured to slide along the axis, and
   wherein the biasing element is located within the track along the axis, such that a biasing force from the biasing element is in a direction along the axis.

4. The surge protector of claim 2, wherein the connection unit is configured to rotate about an axis, and
   wherein the biasing element exerts a biasing force about the axis.

5. The surge protector of claim 1, wherein the connection unit is connected to the second contact,
   wherein the connection unit is not connected to the first contact in the first position, and
   wherein the connection unit is connected to the first contact in the second position, thereby creating a fail short configuration.

6. The surge protector of claim 1, wherein the connection unit is connected to the second contact,
   wherein the connection unit is connected to the first contact in the first position, and
   wherein the connection unit is not connected to the first contact in the second position, thereby creating a fail open configuration.

7. The surge protector of claim 1, wherein the energy absorbing element is a metal oxide varistor.

8. The surge protector of claim 1, wherein the thermal spacing unit is a thermal bulb,
   wherein the first physical state of the thermal bulb is an unbroken state,
   wherein the second physical state of the thermal bulb is a broken state,
   wherein the thermal bulb is configured to break when a temperature of the thermal bulb exceeds a temperature threshold, and
   wherein the connection unit is in the first position when the thermal bulb is unbroken, and the connection unit is in the second position when the thermal bulb is broken.

9. The surge protector of claim 1, wherein the thermal spacing unit is a thermal bulb,
   wherein the thermal bulb has a first size in the first physical state,
   wherein the thermal bulb has a second size in the second physical state, and
   wherein the thermal bulb is configured to expand or contract when a temperature of the thermal bulb exceeds a temperature threshold.

10. The surge protector of claim 1, further comprising a recess in the second contact, the recess housing the thermal spacing unit.

11. The surge protector of claim 1, further comprising an insulation unit surrounding the energy absorbing element and located between the first contact and the second contact, separating the first contact and the second contact.

12. A surge protector comprising:
    a first contact being electrically conductive;
    a second contact being electrically conductive and having a track having a first end and a second end along an axis;
    an energy absorbing element configured to absorb energy and release absorbed energy as heat, the energy absorbing element having a first contact surface and a second contact surface, the first contact surface of the energy absorbing element contacting the first contact and the second contact surface of the energy absorbing element contacting the second contact, such that electrical current travels from the first contact to the second contact via the energy absorbing element;
    a thermal spacing unit contacting the energy absorbing element, the thermal spacing unit configured to be in a first physical state or a second physical state based on a temperature of the energy absorbing element;
    a connection unit connected to the second contact and located within the track, the connection unit configured to slide along the axis and to be in a first position when the thermal spacing unit is in a first physical state and a second position when the thermal spacing unit is in a second physical state, such that the electrical current travelling from the first contact to the second contact via the energy absorbing element is interrupted when the connection unit is in the second position; and
    a biasing element connected to the connection unit, located within the track along the axis such that a biasing force from the biasing element is in a direction along the axis to urge the connection unit from the first position to the second position, and
    wherein the thermal spacing unit prevents the connection unit from moving from the first position to the second position.

13. The surge protector of claim 12, wherein the connection unit is configured to rotate about an axis, and wherein the biasing element exerts a biasing force about the axis.

14. The surge protector of claim 12, wherein the connection unit is connected to the second contact,
    wherein the connection unit is not connected to the first contact in the first position, and
    wherein the connection unit is connected to the first contact in the second position, thereby creating a fail short configuration.

15. The surge protector of claim 12, wherein the connection unit is connected to the second contact,
    wherein the connection unit is connected to the first contact in the first position, and
    wherein the connection unit is not connected to the first contact in the second position, thereby creating a fail open configuration.

16. The surge protector of claim 12, wherein the thermal spacing unit is a thermal bulb,
    wherein the first physical state of the thermal bulb is an unbroken state,
    wherein the second physical state of the thermal bulb is a broken state,
    wherein the thermal bulb is configured to break when a temperature of the thermal bulb exceeds a temperature threshold, and
    wherein the connection unit is in the first position when the thermal bulb is unbroken, and the connection unit is in the second position when the thermal bulb is broken.

17. The surge protector of claim 12, wherein the thermal spacing unit is a thermal bulb,
    wherein the thermal bulb has a first size in the first physical state, wherein the thermal bulb has a second size in the second physical state, and wherein the thermal bulb is configured to expand or contract when a temperature of the thermal bulb exceeds a temperature threshold.

18. A surge protector comprising:

a first contact being electrically conductive and having a cavity defined by four walls and a bottom surface;

a second contact being electrically conductive and having a contact surface on a bottom side and a track having a first end and a second end along an axis on a top side;

a metal oxide varistor configured to absorb energy and release absorbed energy as heat, the metal oxide varistor having a first contact surface and a second contact surface, the first contact surface of the metal oxide varistor contacting the first contact and the second contact surface of the metal oxide varistor contacting the second contact, such that electrical current travels from the first contact to the second contact via the metal oxide varistor;

a thermal bulb contacting the metal oxide varistor, the thermal bulb configured to be in an unbroken state or a broken state based on a temperature of the metal oxide varistor;

a connection unit located within the track of the second contact, the connection unit configured to slide along the axis in the track, and be in a first position when the thermal bulb is in an unbroken state and a second position when the thermal bulb is in a broken state, the connection unit establishing a direct connection between the first contact and the second contact when the connection unit is in the second position, such that the electrical current travelling from the first contact to the second contact via the metal oxide varistor is interrupted; and a spring located in the track of the second contact in a direction along the axis, the spring connected to the connection unit and urging the connection unit from the first position to the second position, and wherein the thermal bulb prevents the connection unit from moving from the first position to the second position.

19. The surge protector of claim 18, further comprising an insulation member located on a top surface of the walls of the first contact, the insulation member having an opening for receiving the metal oxide varistor, the insulation member preventing a direct connection between the first contact and the second contact.

* * * * *